(12) United States Patent
Oyama et al.

(10) Patent No.: US 9,876,227 B2
(45) Date of Patent: Jan. 23, 2018

(54) SEALED NONAQUEOUS ELECTROLYTE SECONDARY BATTERY AND METHOD OF PRODUCING SAME

(71) Applicants: Yutaka Oyama, Toyota (JP); Keiichi Takahashi, Nishinomiya (JP)

(72) Inventors: Yutaka Oyama, Toyota (JP); Keiichi Takahashi, Nishinomiya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 328 days.

(21) Appl. No.: 14/414,809

(22) PCT Filed: Oct. 15, 2013

(86) PCT No.: PCT/IB2013/002300
§ 371 (c)(1),
(2) Date: Jan. 14, 2015

(87) PCT Pub. No.: WO2014/064499
PCT Pub. Date: May 1, 2014

(65) Prior Publication Data
US 2015/0180033 A1 Jun. 25, 2015

(30) Foreign Application Priority Data
Oct. 22, 2012 (JP) .................................. 2012-233187

(51) Int. Cl.
*H01M 4/525* (2010.01)
*B60L 3/00* (2006.01)
(Continued)

(52) U.S. Cl.
CPC ........... *H01M 4/525* (2013.01); *B60L 3/0046* (2013.01); *B60L 3/04* (2013.01); *B60L 11/005* (2013.01);
(Continued)

(58) Field of Classification Search
None
See application file for complete search history.

(56) References Cited

U.S. PATENT DOCUMENTS

2006/0275666 A1* 12/2006 Chang ............... H01M 10/0431
429/223
2008/0102353 A1* 5/2008 Takezawa ............. H01M 4/661
429/94

(Continued)

FOREIGN PATENT DOCUMENTS

CN 101286576 A 10/2008
JP 2003-203636 A 7/2003

*Primary Examiner* — Jeremiah R Smith
(74) *Attorney, Agent, or Firm* — Sughrue Mion, PLLC

(57) ABSTRACT

The sealed nonaqueous electrolyte secondary battery includes a nonaqueous electrolyte containing a gas generator that is decomposed to generate a gas when a prescribed battery voltage is exceeded, and a battery case that includes a current interrupt device that operates when the pressure within the battery case rises accompanying the gas generation. A positive electrode (10) has a positive electrode mixture layer (14) that contains at least a positive electrode active material (16). This positive electrode mixture layer (14) contains, as conductive agents, electroconductive carbon particles (18) and an expanded graphite (17) that has an average pore diameter of 0.2 μm to 0.5 μm.

8 Claims, 7 Drawing Sheets

(51) Int. Cl.

| | |
|---|---|
| *B60L 3/04* | (2006.01) |
| *B60L 11/00* | (2006.01) |
| *B60L 11/18* | (2006.01) |
| *H01M 4/131* | (2010.01) |
| *H01M 4/1391* | (2010.01) |
| *H01M 4/505* | (2010.01) |
| *H01M 4/62* | (2006.01) |
| *H01M 10/0567* | (2010.01) |
| *H01M 10/42* | (2006.01) |
| *H01M 2/34* | (2006.01) |
| *H01M 10/058* | (2010.01) |
| *H01M 10/0525* | (2010.01) |
| *H01M 4/02* | (2006.01) |

(52) U.S. Cl.
CPC ....... *B60L 11/1861* (2013.01); *B60L 11/1864* (2013.01); *B60L 11/1874* (2013.01); *B60L 11/1877* (2013.01); *B60L 11/1879* (2013.01); *H01M 2/34* (2013.01); *H01M 4/131* (2013.01); *H01M 4/1391* (2013.01); *H01M 4/505* (2013.01); *H01M 4/625* (2013.01); *H01M 10/058* (2013.01); *H01M 10/0567* (2013.01); *H01M 10/4235* (2013.01); *B60L 2240/545* (2013.01); *B60L 2240/547* (2013.01); *B60L 2240/549* (2013.01); *H01M 10/0525* (2013.01); *H01M 2004/021* (2013.01); *H01M 2200/20* (2013.01); *H01M 2220/20* (2013.01); *Y02T 10/7005* (2013.01); *Y02T 10/7022* (2013.01); *Y02T 10/7044* (2013.01); *Y02T 10/7061* (2013.01); *Y10T 29/49115* (2015.01)

(56) References Cited

U.S. PATENT DOCUMENTS

| | | | |
|---|---|---|---|
| 2008/0254355 A1 | 10/2008 | Muraoka et al. | |
| 2008/0268338 A1* | 10/2008 | Lee | H01M 4/06 429/218.1 |
| 2009/0325069 A1* | 12/2009 | Anada | C09J 123/147 429/217 |
| 2010/0136428 A1* | 6/2010 | Yokoyama | H01M 4/13 429/209 |
| 2011/0168944 A1* | 7/2011 | Chang | H01M 4/485 252/182.1 |
| 2011/0274971 A1* | 11/2011 | Sakamoto | H01M 4/13 429/217 |
| 2013/0136964 A1* | 5/2013 | Li | H01M 2/18 429/62 |
| 2013/0252108 A1* | 9/2013 | Richards | H01M 4/0445 429/223 |

* cited by examiner

SEALED NONAQUEOUS ELECTROLYTE SECONDARY BATTERY AND METHOD OF PRODUCING SAME

BACKGROUND OF THE INVENTION

1. Field of the Invention

The invention relates to a nonaqueous electrolyte secondary battery and to a method of producing the same. More particularly, the invention relates to a sealed nonaqueous electrolyte secondary battery that is provided with a current interrupt device that operates by a rise in internal pressure and also relates to a method of producing this battery.

2. Description of Related Art

Lithium ion secondary batteries and other secondary batteries are smaller, lighter, and have higher energy densities than older batteries and exhibit better output densities. As a consequence, they have in recent years entered into preferential use as so-called portable power sources for, e.g., personal computers and portable terminals, and as vehicle drive power sources.

One embodiment of these batteries is the sealed nonaqueous electrolyte secondary battery. This battery is typically fabricated by inserting an electrode assembly containing positive and negative electrodes into a battery case along with a nonaqueous electrolyte (typically a nonaqueous electrolyte solution) and then applying a lid and closing off (sealing) the opening. The positive electrode in a sealed nonaqueous electrolyte secondary battery has a structure in which an electrode material—which is composed mainly of a material (the positive electrode active material) that can reversibly engage in the insertion and extraction of the chemical species (for example, the lithium ion) that constitutes the charge carrier—is formed as a layer on an electroconductive member (the positive electrode current collector); this layer-formed material is referred to below as the "positive electrode mixture layer". One example of this positive electrode active material is a complex oxide that contains at least nickel, cobalt, and manganese as transition metal elements (for example, a lithium complex oxide). Such a complex oxide is a positive electrode active material that exhibits a high capacity and an excellent thermal stability.

The electroconductivity of the positive electrode may be reduced (the battery resistance may be increased) depending on the positive electrode active material present in the positive electrode mixture layer. The electroconductivity of the positive electrode undergoes a decline when a positive electrode active material is used that itself has a low electroconductivity, such as complex oxides that contain at least nickel, cobalt, and manganese as transition metal elements ("NCM complex oxides" below). When the proportion of the conductive agent present in the positive electrode mixture layer is raised in order to raise the electroconductivity of the positive electrode, the battery capacity is then impaired due to the decline in the proportion of the positive electrode active material. As a consequence, pressing the positive electrode mixture layer at high pressures (raising the density of the positive electrode mixture) during formation of the positive electrode mixture layer can be considered for the purpose of raising the electroconductivity of the positive electrode. This improves the electroconductivity of the positive electrode by raising the intimacy of contact (increasing the contact area) between the positive electrode active material and the conductive agent.

Sealed nonaqueous electrolyte secondary batteries are generally used under controlled conditions in which the voltage resides in a prescribed range (for example, from 3.0 V to not more than 4.2 V); however, overcharging can occur when the prescribed voltage is exceeded when a greater than normal current is supplied to the battery. Current interrupt devices (CIDs)—which interrupt the charging current when the voltage in the battery case reaches or exceeds a prescribed value—are widely used as an overcharge countermeasure. When the battery assumes an overcharged state, for example, the nonaqueous solvent in the nonaqueous electrolyte typically undergoes electrolysis with the generation of a gas. The current interrupt device cuts the charging circuit for the battery based on the gas generation and can thereby prevent further overcharging. With regard to the use of this current interrupt device, a method is available in which a compound having a lower oxidation potential (i.e., a lower voltage at which oxidative decomposition begins) than the nonaqueous solvent in the nonaqueous electrolyte is incorporated in the nonaqueous electrolyte in advance (such a compound is referred to below as a "gas generator"). When the battery enters an overcharged state, the gas generator rapidly undergoes oxidative decomposition at the surface of the positive electrode with the production of the hydrogen ion ($H^+$). The hydrogen ion diffuses in the nonaqueous electrolyte and is reduced on the negative electrode to produce hydrogen gas ($H_2$). The current interrupt device can be rapidly operated due to the rise in pressure within the battery case brought about by this gas generation.

When, as noted above, the positive electrode mixture layer is subjected to high-pressure pressing (raising the density of the positive electrode mixture) in order to raise the electroconductivity of a positive electrode that contains a relatively weakly electroconductive NCM complex oxide, the pores (voids) in the positive electrode mixture layer are reduced (in particular there is a tendency for the relatively large pores to be diminished). Since a film originating from the gas generator may block the pores in the positive electrode mixture layer when the gas generator undergoes decomposition, the failure to achieve a satisfactory pore formation in the positive electrode mixture layer can result in a decline in the amount of gas that can be generated within the battery case during a pressure rise within the battery case and the current interrupt device may then be unable to undergo rapid operation.

SUMMARY OF THE INVENTION

The invention provides a sealed nonaqueous electrolyte secondary battery that realizes a reduced battery resistance and a high reliability in terms of ensuring the generation of an adequate amount of gas during a pressure rise within the battery case.

The inventor discovered that this object could be realized by the additional incorporation of an expanded graphite having a prescribed average pore diameter in a positive electrode mixture layer that contains electroconductive carbon particles, and achieved the invention based on this discovery.

A first aspect of the invention relates to a sealed nonaqueous electrolyte secondary battery provided with an electrode assembly having a positive electrode and a negative electrode, a nonaqueous electrolyte, and a battery case that houses this electrode assembly and nonaqueous electrolyte. This nonaqueous electrolyte contains a gas generator that is decomposed to generate a gas when a prescribed battery voltage is exceeded. The battery case includes a current interrupt device that operates when the pressure within the battery case rises accompanying the gas generation. The positive electrode here is provided with a positive electrode current collector and a positive electrode mixture layer containing at least a positive electrode active material and formed on the positive electrode current collector. The positive electrode mixture layer contains, as conductive agents, electroconductive carbon particles and an expanded graphite having an average pore diameter of 0.2 µm to 0.5 µm.

The incorporation of an expanded graphite in a positive electrode mixture layer is present in Japanese Patent Application Publication No. 2003-203636 (JP 2003-203636 A), but the technical concept (problem) described in JP 2003-203636 A is different from that in the invention and neither suggests nor provides motivation for the structure of the invention.

The positive electrode mixture layer in the herein described secondary battery contains a positive electrode active material and, as conductive agents, electroconductive carbon particles and an expanded graphite that has an average pore diameter of 0.2 µm to 0.5 µm. Because the positive electrode mixture layer contains this expanded graphite with an average pore diameter of 0.2 µm to 0.5 µm in addition to the electroconductive carbon particles, a satisfactory intimacy of contact (contact area) between the positive electrode active material and the electroconductive carbon particles and expanded graphite can be ensured even without increasing the pressing pressure (even without increasing the density of the positive electrode mixture) during formation of the positive electrode mixture layer. That is, since, with regard to its properties, expanded graphite forms conductive pathways within the positive electrode active material more readily than does the other electroconductive carbon particles, conductive pathways can be satisfactorily formed even without raising the intimacy of contact (increasing the contact area) between the positive electrode active material and the conductive agent by increasing the pressure for pressing the positive electrode mixture layer. This makes it possible to realize a reduction in battery resistance (improvement in electroconductivity) even with a positive electrode that uses a positive electrode active material that has a relatively low electroconductivity. In addition, since less pressing pressure on the positive electrode mixture layer is needed than in the absence of the expanded graphite in the positive electrode mixture layer, numerous pores having relatively large pore diameters (for example, 0.5 µm to 1 µm) is formed in the positive electrode mixture layer. In addition, since pores are also formed in the expanded graphite itself, pores are formed in a satisfactory amount in the positive electrode mixture layer while ensuring the electroconductivity. As a consequence, the amount of gas that can be generated within the battery case during a pressure rise within the battery case can be increased and a very rapid operation of the current intercept device is then made possible. Based on these features, a sealed nonaqueous electrolyte secondary battery (for example, a sealed lithium ion secondary battery) can be provided that realizes a low battery resistance and that is highly reliable in terms of ensuring the generation of an adequate amount of gas during a pressure rise within the battery case.

The above-described positive electrode active material may be a complex oxide that contains at least nickel, cobalt, and manganese as transition metal elements. NCM complex oxides are favorably used as a positive electrode active material because they exhibit a high thermal stability and also a high energy density, but due to their relatively low electroconductivities the electroconductivity of the positive electrode tends to decline. However, the decline in the electroconductivity of the positive electrode can be suppressed through the incorporation of the electroconductive carbon particles and the expanded graphite with an average pore diameter of 0.2 µm to 0.5 µm as conductive agents.

The molar ratio between the nickel and manganese (Ni/Mn) in the complex oxide may be equal to or smaller than 1.5. A complex oxide with a molar ratio between the nickel and manganese of not more than 1.5 (preferably not more than 1.26) exhibits a high thermal stability and also a high energy density, but does exhibit a declining trend for the electroconductivity. However, the decline in the electroconductivity of the positive electrode can be suppressed through the incorporation of the electroconductive carbon particles and the expanded graphite with an average pore diameter of 0.2 µm to 0.5 µm as conductive agents.

At least 50 mass % of the expanded graphite in the positive electrode mixture layer may be disposed in a state in which the angle formed between the (002) plane (basal plane) of the expanded graphite and the surface of the positive electrode current collector is at least 60°. In such a case, the pores formed between the (002) planes in the expanded graphite are disposed within the expanded graphite in a perpendicular direction with respect to the positive electrode current collector (for example, the direction orthogonal to the positive electrode current collector), and as a consequence gas generator decomposition proceeds well when overcharging occurs and the generation of an adequate amount of gas can be realized. In this Specification, the "(002) plane of the expanded graphite" refers to the plane that is the layer plane (plane parallel to the graphite layers) of the layer-structured expanded graphite and that is parallel to the carbon network of the graphene sheet that constitutes the expanded graphite.

The amount of addition of the expanded graphite in the positive electrode mixture layer may be larger than the amount of addition of the carbon particles in the positive electrode mixture layer. In such a case, a sealed nonaqueous electrolyte secondary battery can be prepared that is provided with a positive electrode in which pores having larger pore diameters are formed, while at the same time the battery resistance is lowered. As a consequence, gas generator decomposition proceeds well during a pressure rise within the battery case and the generation of an adequate amount of gas can be realized.

The carbon particles may be an acetylene black that has an average primary particle diameter of 10 nm to 100 nm and an average secondary particle diameter of 0.1 µm to 5 µm. Such a construction makes it possible to reduce the battery resistance of the positive electrode and to also form numerous micropores in the positive electrode mixture layer.

The gas generator may include cyclohexylbenzene and biphenyl, and a mass ratio between the cyclohexylbenzene and the biphenyl may be 1 to 4. Such a construction makes it possible when the pressure within the battery case rises to bring about a very rapid operation by the current intercept device through an excellent gas generation based on the decomposition of the cyclohexylbenzene and biphenyl.

A second aspect of the invention relates to a method of producing a sealed nonaqueous electrolyte secondary battery that is provided with an electrode assembly that includes a positive electrode having a positive electrode mixture layer formed on a positive electrode current collector, and a negative electrode having a negative electrode mixture layer formed on a negative electrode current collector; a nonaqueous electrolyte; a battery case that houses the electrode assembly and the nonaqueous electrolyte; and a current interrupt device that operates when the pressure within the battery case rises. This production method includes preparing a paste-form composition for forming the positive electrode mixture layer, the composition containing at least a positive electrode active material, a conductive agent, and a prescribed solvent, the conductive agent containing electroconductive carbon particles and an expanded graphite having an average pore diameter of 0.2 µm to 0.5 µm; coating the prepared composition on a surface of the positive electrode current collector; drying the coated composition to fabricate a positive electrode having the positive electrode mixture layer formed on the positive electrode current collector; fabricating the electrode assembly having the thusly fabricated positive electrode; and housing, within the battery case, the thusly fabricated electrode assembly and the nonaqueous electrolyte containing a gas generator that is decomposed to generate a gas when a prescribed battery voltage is exceeded.

In this production method, the prepared composition for forming a positive electrode mixture layer contains a positive electrode active material and, as conductive agents, electroconductive carbon particles and an expanded graphite having an average pore diameter of 0.2 µm to 0.5 µm. As a consequence, the intimacy of contact between the positive electrode active material and the electroconductive carbon particles and expanded graphite in the positive electrode mixture layer formed by drying this composition is satisfactorily ensured through the presence of the expanded graphite. Furthermore, because the positive electrode mixture layer contains the expanded graphite having an average pore diameter of 0.2 µm to 0.5 µm, numerous pores having relatively large pore diameters is formed in the positive electrode mixture layer. These features make possible the production of a sealed nonaqueous electrolyte secondary battery (for example, a sealed lithium ion secondary battery) that realizes a reduced battery resistance and a high reliability in terms of ensuring the generation of an adequate amount of gas during a pressure rise within the battery case.

A complex oxide containing at least nickel, cobalt, and manganese as transition metal elements may be used as the positive electrode active material. A molar ratio (Ni/Mn) between the nickel and manganese in the complex oxide may be equal to or smaller than 1.5.

This production method may be including applying, prior to the drying of the coated composition, a magnetic field to the composition coated on the surface of the positive electrode current collector, in a direction orthogonal to the surface of the positive electrode current collector. By doing this, the pores formed between the (002) planes of the expanded graphite can be disposed in a perpendicular direction with respect to the positive electrode current collector (for example, in the direction orthogonal to the positive electrode current collector), and as a consequence gas generator decomposition proceeds well when overcharging occurs and the generation of an adequate amount of gas can be brought about.

The composition may be prepared to provide an amount of addition of the expanded graphite in the composition that is larger than the amount of addition of the carbon particles in the composition. By doing this, numerous pores having larger pore diameters can be formed in the positive electrode mixture layer, while at the same time reducing the battery resistance.

An acetylene black having an average primary particle diameter of 10 nm to 100 nm and an average secondary particle diameter of 0.1 µm to 5 µm may be used for the carbon particles. By doing this, numerous micropores can be additionally formed in the positive electrode mixture layer while also reducing the battery resistance of the positive electrode.

The invention also provides a battery pack as a vehicle drive power source formed by electrically interconnecting a plurality of single cells. In this battery pack, the above-described sealed nonaqueous electrolyte secondary battery is used as the single cell, or a sealed nonaqueous electrolyte secondary battery obtained by the above-described production method is used as the single cell. As has been described in the preceding, the sealed nonaqueous electrolyte secondary battery realizes a reduction in the battery resistance and also very reliably ensures the generation of a satisfactory amount of gas during a pressure rise within the battery case. As a result, a battery pack in which a plurality (for example, at least 10 and preferably about 40 to 80) of these secondary batteries are electrically interconnected can be advantageously used as a drive power source (for example, a power source for motor operation) in vehicles (typically plug-in hybrid vehicles (PHV), hybrid vehicles (HV), and electric vehicles (EV)).

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Matters required for the execution of an embodiment of the invention, but not included in the matters particularly described in this Specification, can be understood as design matters for the individual skilled in the art based on the conventional art in the pertinent field. An embodiment of the invention can be implemented based on the contents disclosed in this Specification and the common general technical knowledge in the pertinent field. While a lithium ion secondary battery is more particularly described below as a typical example, this should not be construed as limiting the applications of the invention to this battery.

In this Specification, a "nonaqueous electrolyte secondary battery" refers to a battery that has a nonaqueous electrolyte (typically a nonaqueous electrolyte solution that contains a supporting electrolyte in a nonaqueous solvent). A "lithium ion secondary battery" refers to a secondary battery that uses the lithium ion as the electrolyte ion and that realizes charge/discharge by the lithium ion-mediated movement of charge between the positive and negative electrodes. The secondary batteries generally called as lithium ion batteries, lithium ion capacitors, and so forth, are typical examples encompassed by lithium ion secondary batteries in this Specification. In addition, the "active material" is a material (compound) at the positive electrode and negative electrode that can engage in the reversible insertion and extraction of a chemical species that is the charge carrier (the lithium ion in a lithium ion secondary battery). In this Specification an "overcharged state" refers to a state in which the state of charge (SOC) exceeds 100%. With reference to the operating voltage range for reversible charge/discharge, this SOC indicates the charge state where 100% is the charge state when the upper limit voltage is obtained (that is, the fully charged state) and 0% is the charge state when the lower limit voltage is obtained (that is, the uncharged state).

Figure 5:
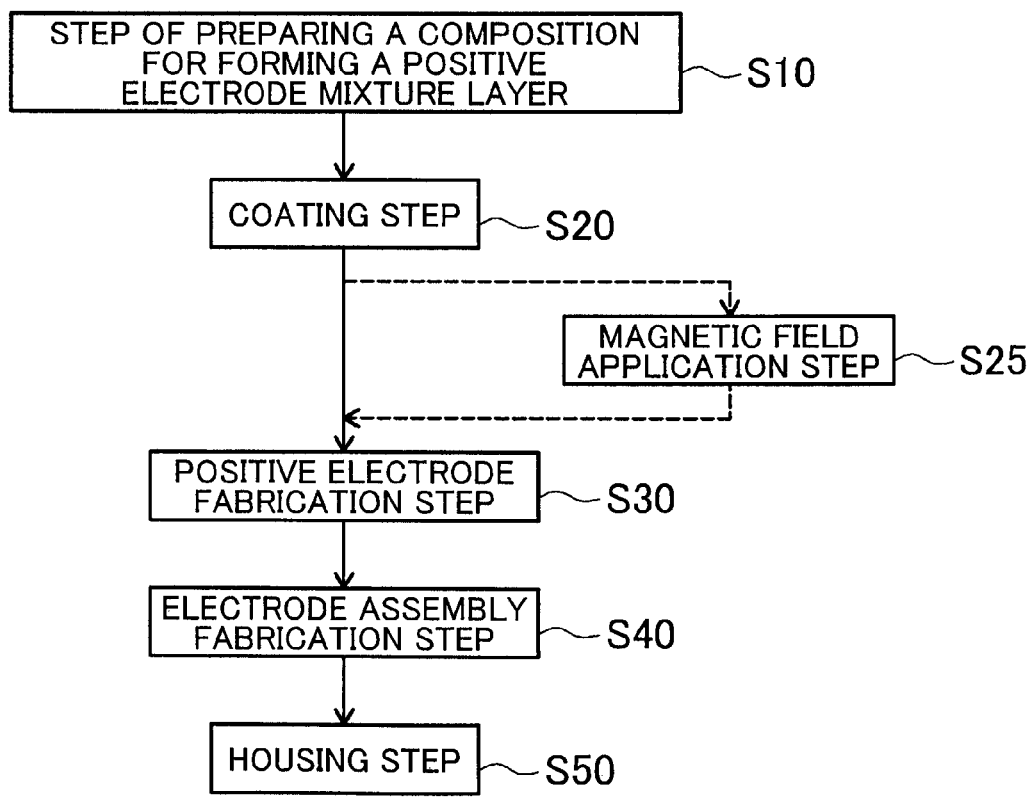
FIG. 5 is a flow chart describing the method of producing a sealed nonaqueous electrolyte secondary battery according to an embodiment of the invention.

As shown in FIG. 5, the method of producing the sealed nonaqueous electrolyte secondary battery (lithium ion secondary battery) of this embodiment encompasses a step of preparing a composition for forming a positive electrode mixture layer S10, a coating step S20, a positive electrode fabrication step S30, an electrode assembly fabrication step S40, and a housing step S50. A preferred embodiment additionally includes a magnetic field application step S25 between the coating step S20 and the positive electrode fabrication step S30.

<<The Step of Preparing a Composition for Forming a Positive Electrode Mixture Layer>>

The step of preparing a composition for forming a positive electrode mixture layer S10 is described first. In this step, a paste-form composition for forming the positive electrode mixture layer (referred to below as the "positive electrode composition") and containing at least a positive electrode active material and a conductive agent is prepared. Besides the positive electrode active material and conductive agent, the positive electrode composition may as necessary contain optional components such as, for example, a binder. The paste-form positive electrode composition also encompasses slurry-form positive electrode compositions and ink-form positive electrode compositions.

The positive active material here is a material that can engage in the insertion and extraction of the lithium ion and can be exemplified by lithium complex oxides that contain the element lithium and one or two or more transition metal elements. The lithium complex oxides can be exemplified by complex oxides that contain at least nickel (Ni), cobalt (Co), and manganese (Mn) as the transition metal elements (NCM complex oxides). NCM complex oxides have a relatively low electroconductivity and as a consequence the positive electrode can have a reduced electroconductivity.

The NCM complex oxide can be exemplified by $Li_aNi_xCo_yMn_zM_bO_2$ (wherein $1 \le a \le 2$, $0 < x < 1$, $0 < y < 1$, $0 < z < 1$, $0 \le b < 1$, $x+y+z+b=1$, and M is at least one element selected from F, B, Al, W, Mo, Cr, Ta, Nb, V, Zr, Ti, and Y (M is typically a transition metal element)). Specific examples are $LiNi_{0.33}Co_{0.33}Mn_{0.33}O_2$ ($LiNi_{1/3}Co_{1/3}Mn_{1/3}O_2$), $LiNi_{0.5}Co_{0.2}Mn_{0.3}O_2$, and $LiNi_{0.4}Co_{0.3}Mn_{0.3}O_2$. Another example is an NCM complex oxide in which the molar ratio between the nickel, cobalt, and manganese is 38:32:30. The molar ratio between the nickel and manganese (Ni/Mn) in this NCM complex oxide can be equal to or smaller than 1.5 (preferably not more than 1.26, for example, 1 to 1.26). When the molar ratio between the nickel and manganese is not more than 1.5, the electroconductivity of the NCM complex oxide tends to be low and as a consequence the electroconductivity of the positive electrode tends to decline. The thermal stability is excellent and the energy density is also high, and, in the case of use of $LiNi_{0.33}Co_{0.33}Mn_{0.33}O_2$ with its relatively low electroconductivity, the decline in the electroconductivity of the positive electrode can be suppressed when the electroconductive carbon particles and expanded graphite having an average pore diameter of 0.2 μm to 0.5 μm are incorporated as conductive agents in the positive electrode mixture layer (also referred to as a positive electrode active material layer). A polyanion-type compound as indicated by the general formulas $LiMPO_4$, $LiMVO_4$, and $Li_2MSiO_4$ (M in the formulas is at least one element selected from Co, Ni, Mn, and Fe) (for example, $LiFePO_4$, $LiMnPO_4$, $LiFeVO_4$, $LiMnVO_4$, $Li_2FeSiO_4$, $Li_2MnSiO_4$, and $Li_2CoSiO_4$) may also be used as the positive electrode active material.

The lithium complex oxide can take the form of secondary particles provided by the aggregation of primary particles, and the average particle diameter of these secondary particles is, for example, not more than 20 μm (typically from at least 0.1 μm to not more than 20 μm, for example, from at least 0.5 μm to not more than 15 μm and preferably from at least 1 μm to not more than 10 μm). When the form of the lithium complex oxide is in the indicated range, a fine and dense positive electrode mixture layer having a high electroconductivity can be fabricated. In addition, because suitable voids can be maintained within the positive electrode mixture layer, permeation by the nonaqueous electrolyte is facilitated and a broad reaction field with the gas-generating additive during overcharging can thus be secured. The average particle diameter here refers to the median diameter (D50:50% volumetric average particle diameter) derived from the particle size distribution measured using any of various commercially available particle size distribution analyzers that are based on laser diffraction scattering methods. The proportion of the positive electrode active material (lithium complex oxide) in the positive electrode mixture layer as a whole is not particularly limited, but is preferably at least 80 mass % (typically from at least 80 mass % to less than 100 mass %, for example, from at least 90 mass % to not more than 95 mass %).

Electroconductive carbon particles and expanded graphite are incorporated as the aforementioned conductive agent in the positive electrode composition in this embodiment. The electroconductive carbon particles may be any electroconductive carbon particle heretofore used in lithium ion secondary batteries of this type and there is no limitation to a particular conductive agent. For example, carbon materials, e.g., a carbon powder and so forth, can be used. Various carbon blacks, e.g., acetylene black (AB), furnace black, Ketjen black, and so forth, can be used as the carbon powder. Among these, AB is an example of a preferred carbon particle. A single one of these conductive agents may be used alone or suitable combinations of two or more may be used. With regard to the average particle diameter of the electroconductive carbon particle, for example, the average primary particle diameter is 10 nm to 100 nm and the average secondary particle diameter is 0.1 μm to 5 μm (preferably 0.5 μm to 2 μm). The proportion of the electroconductive carbon particles in the positive electrode mixture layer as a whole is not particularly limited, but, for example, from at least 0.1 mass % to not more than 5 mass % (typically from at least 1 mass % to not more than 3 mass %) is preferred.

The average pore diameter of the expanded graphite is 0.2 μm to 0.5 μm (for example, 0.2 μm to 0.4 μm and preferably 0.3 μm to 0.35 μm). An expanded graphite with an average pore diameter in this range has both an excellent electroconductivity and a satisfactory amount of pores. When the average pore diameter is smaller than 0.2 μm, adequate pore formation does not occur in the expanded graphite itself, and as a consequence a sufficient amount of pore formation may not occur in the positive electrode mixture layer that uses such an expanded graphite. When the average pore diameter is larger than 0.5 μm, the electronic conductivity of the expanded graphite may end up declining and the battery resistance may undergo an increase. The proportion of the expanded graphite in the positive electrode mixture layer is not particularly limited, but, for example, is preferably from at least 0.1 mass % to not more than 5 mass % (typically from at least 1 mass % to not more than 3 mass %). The proportion of the expanded graphite in the positive electrode mixture layer as a whole is preferably larger than the proportion of the electroconductive carbon particles. That is, the positive electrode composition is prepared to provide a quantity of added expanded graphite in the positive electrode composition that is larger than the quantity of added electroconductive carbon particle in the positive electrode composition. By doing this, numerous pores having larger pore diameters can be formed in the positive electrode mixture layer while at the same time the battery resistance is reduced. The expanded graphite can be produced by conventional methods by inserting an ion or other molecule between the layers of a natural graphite (between the graphene sheets) and carrying out a heat treatment on the product. In this Specification, the "average pore diameter" refers to the value obtained based on measurement by an ordinary mercury porosimetric method.

The same binders as used in the positive electrodes of common lithium ion secondary batteries can be used as appropriate as the binder referenced above. For example, when a solvent-based paste-form composition is used as the positive electrode composition, polymers that are soluble in organic solvent (nonaqueous solvents), e.g., polyvinylidene fluoride (PVDF), polyvinylidene chloride (PVDC), and so forth, can be used. Or, when a water-based paste-form composition is used, a water-soluble (dissolves in water) polymer or a water-dispersible (disperses in water) polymer can preferably be used. Examples are polytetrafluoroethylene (PTFE), carboxymethyl cellulose (CMC), and styrene-butadiene rubber (SBR). In addition to their use as binders, the polymers provided as examples here can also be used as thickeners for the positive electrode composition and as other additives. The proportion of the binder in the positive electrode mixture layer as a whole is not particularly limited, but, for example, can be from at least 0.1 mass % to not more than 10 mass % (preferably from at least 1 mass % to not more than 7 mass %).

The "solvent-based paste-form composition" referenced here denotes a composition in which the dispersion medium for the positive electrode active material is principally an organic solvent (nonaqueous solvent). The nonaqueous solvent can be exemplified by amide solvents, alcohol solvents, ketone solvents, ester solvents, amine solvents, ether solvents, nitrile solvents, cyclic ether solvents, and aromatic hydrocarbon solvents. It can be more specifically exemplified by N-methyl-2-pyrrolidone (NMP), N,N-dimethylformamide, N,N-dimethylacetamide, 2-propanol, ethanol, methanol, acetone, methyl ethyl ketone, methyl propanoate, cyclohexanone, methyl acetate, ethyl acetate, methyl acrylate, diethyltriamine, N,N-dimethylaminopropylamine, acetonitrile, ethylene oxide, tetrahydrofuran, dioxane, benzene, toluene, ethylbenzene, xylene, dimethyl sulfoxide, dichloromethane, trichloromethane, and dichloroethane, while NMP can typically be used. The "water-based paste-form composition" denotes a composition in which water or a mixed solvent composed mainly of water (for example, at least 80 mass % of the mixed solvent is water) is used as the dispersion medium for the positive electrode active material. The solvent other than water in such a mixed solvent can be one or two or more selections as appropriate from organic solvents that are uniformly miscible with water (lower alcohols, lower ketones, and so forth).

The process of mixing (mixing/kneading) the positive electrode active material, electroconductive carbon particles, expanded graphite, and so forth, in the solvent can be carried out using, for example, a suitable mixer/kneader (planetary mixer, HOMO DISPER, CLEARMIX, FILMIX, and so forth). To produce the positive electrode composition, the positive electrode active material, carbon particles, and expanded graphite are mixed/kneaded using a small amount of solvent. This may be followed by dilution of the obtained mixed/kneaded material with a suitable amount of solvent. The solids fraction (nonvolatile fraction, i.e., the proportion of the components that will form the positive electrode mixture layer) in the positive electrode composition will be about 30 mass % to 65 mass % and is preferably about 40 mass % to 55 mass %.

<<The Coating Step>>

The coating step S20 is described in the following. In this embodiment, the positive electrode composition prepared as described above is coated on a surface of the positive electrode current collector. This coating of the thusly prepared positive electrode composition on a surface of the positive electrode current collector may be performed in the same manner as in the fabrication of electrodes (positive electrodes) for ordinary conventional lithium ion secondary batteries. For example, a suitable existing coating apparatus can be used, as typified by, for example, strip coaters, comma coaters, and gravure coaters.

The same highly electroconductive metals as used for the positive electrode current collectors in the positive electrodes of conventional lithium ion secondary batteries are used for the positive electrode current collector here (for example, aluminum, aluminum alloys in which the main component is aluminum, nickel, titanium, stainless steel, and so forth). The shape of the positive electrode current collector will vary in conformity, for example, to the shape of the lithium ion secondary battery and thus is not particularly limited and can assume various configurations such as, for example, foils, sheets, bars, and plates. When, for example, the positive electrode current collector is in the shape of a sheet, the thickness of the positive electrode current collector will be about 5 μm to 50 μm (for example, 8 μm to 30 μm).

<<The Magnetic Field Application Step>>

The magnetic field application step S25 used in this embodiment will be explained in the following. In a magnetic field application step, before the drying of the previously described coated positive electrode composition, a magnetic field is applied to the positive electrode composition coated on a surface of the positive electrode current collector with the magnetic field being applied in the direction orthogonal to the surface of the positive electrode current collector. While a magnetic field application step S25 is provided in the lithium ion secondary battery (sealed nonaqueous electrolyte secondary battery) production method according to this embodiment, there is no limitation to this configuration. That is, the positive electrode fabrication step S30 may be carried out after the coating step S20 without executing a magnetic field application step S25.

In the magnetic field application step, a magnetic field is applied to the positive electrode composition coated on a surface of the positive electrode current collector by disposing a pair of magnetic field generators in proximity to the positive electrode current collector so that the lines of magnetic force will run in the direction orthogonal to the surface of the positive electrode current collector (i.e., the width face). By disposing a pair of magnetic field generators in the indicated manner, a magnetic field in which the lines of magnetic force are generated in the direction orthogonal to the positive electrode current collector surface can be applied to the expanded graphite present in the positive electrode composition coated on the surface of the positive electrode current collector. The magnetic field generator can be any magnetic field generator and is not particularly limited; examples are a permanent magnet and an electromagnetic coil.

The strength of the magnetic field that acts in the magnetic field application step on the positive electrode composition coated on the positive electrode current collector surface is, for example, approximately 0.08 T to 1 T and is ordinarily approximately 0.4 T to 0.6 T. In addition, the time of application of the magnetic field to the positive electrode composition is approximately 1 second to 120 seconds. The expanded graphite in the positive electrode composition coated on the positive electrode current collector tends to be oriented so that the (002) plane (basal plane) of the expanded graphite becomes approximately parallel to, the surface (width face) of the positive electrode current collector (oriented, for example, so the angle θn formed between the (002) plane of the expanded graphite and the surface of the positive electrode current collector is $0° \leq θn \leq 30°$). The (002) plane of the expanded graphite in the positive electrode composition can be oriented to stand perpendicularly (oriented, for example, so that the angle θn formed between the (002) plane of the expanded graphite and the surface of the positive electrode current collector is $60° \leq θn \leq 90°$) to the positive electrode current collector by the application to the positive electrode composition of the magnetic field in which the lines of magnetic force are generated in the direction orthogonal to the surface of the positive electrode current collector.

<<The Positive Electrode Fabrication Step>>

The positive electrode fabrication step S30 is described in the following. In this embodiment, the coated positive electrode composition is dried to fabricate a positive electrode in which a positive electrode mixture layer is formed on the positive electrode current collector.

The solvent present in the positive electrode composition coated on the positive electrode current collector surface is removed by a suitable drying procedure in the positive electrode fabrication step. This procedure can be a single selection or a combination of selections from drying by natural drying, a hot gas current, a low-humidity gas current, a vacuum, infrared radiation, far infrared radiation, an electron beam, and so forth. A positive electrode in which a positive electrode mixture layer is formed on the positive electrode current collector surface is fabricated by removal of the solvent (for example, NMP) from the positive electrode composition. In addition, the thickness and density of the positive electrode mixture layer can be adjusted by the execution of a suitable pressing treatment on the thusly fabricated positive electrode. This pressing treatment can use any of various conventional pressing methods, for example, roll pressing methods, platen pressing methods, and so forth. The density of the positive electrode mixture layer after the pressing treatment is not particularly limited and can be, for example, at least 2.1 $g/cm^3$ but not more than 3.0 $g/cm^3$.

Figure 4:
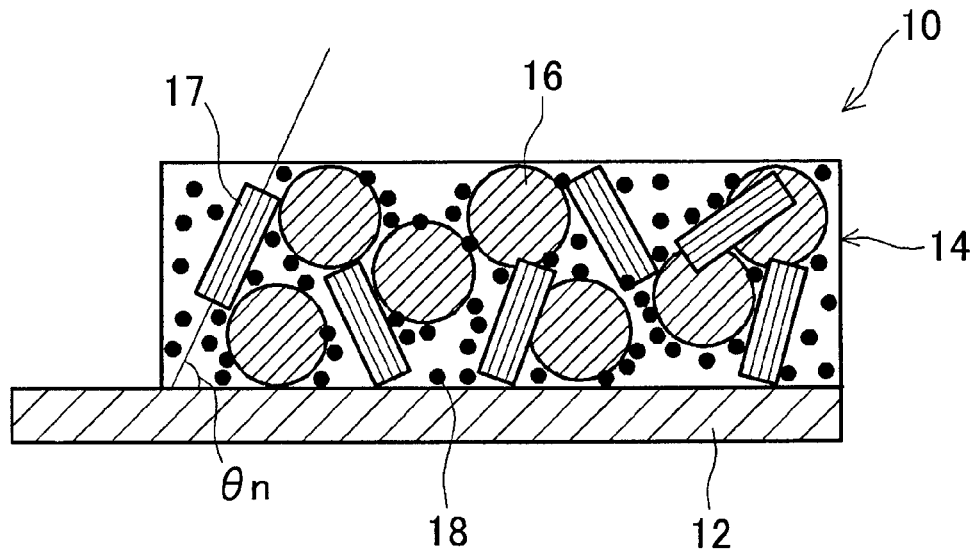
FIG. 4 is a schematic drawing that shows the structure of the positive electrode in a sealed nonaqueous electrolyte secondary battery according to an embodiment of the invention.

As shown in FIG. 4, the positive electrode sheet (positive electrode) 10 fabricated in the preceding step is provided with a positive electrode current collector 12 and a positive electrode mixture layer 14 that is formed on the positive electrode current collector 12 and that contains at least a positive electrode active material 16. In addition to the positive electrode active material 16, inter alia, an expanded graphite 17 having an average pore diameter of 0.2 µm to 0.5 µm and electroconductive carbon particles 18 are dispersed in the positive electrode mixture layer 14. While a positive electrode active material 16 having a relatively low electroconductivity is used in the positive electrode sheet 10 according to this embodiment, the incorporation as conductive agents of the electroconductive carbon particles 18 and the expanded graphite 17 having an average pore diameter of 0.2 µm to 0.5 µm makes it possible to realize a reduced battery resistance and to also form numerous pores having relatively large pore diameters (for example, 0.5 µm to 1 µm) in the positive electrode mixture layer 14.

In addition, due to the execution in this embodiment of the magnetic field application step S25 after the coating step S20, at least 50 mass % of the expanded graphite 17 in the positive electrode mixture layer 14 is disposed in a state in which the angle θn formed between the (002) plane of the expanded graphite 17 and the surface of the positive electrode current collector 12 is at least 60° (for example, θn is 60° to 90° and θn is preferably 90°). As a consequence, the pores formed between the (002) planes of the expanded graphite 17 are disposed so as to run within the expanded graphite 17 in the perpendicular direction with respect to the positive electrode current collector 12 (for example, are disposed so the angle formed between the pore central axis and the surface of the positive electrode current collector 12 is 60° to 90°), and as a result gas generator decomposition proceeds well during a pressure rise within the battery case and the generation of an adequate amount of gas can be realized. An indication of components other than the positive electrode active material 16, expanded graphite 17, and carbon particles 18, for example, the binder and so forth, has been omitted from FIG. 4.

The peak pore diameter of the positive electrode mixture layer in this embodiment is 0.5 µm to 1.5 µm (for example, 0.5 µm to 1 µm). In this Specification, the "peak pore diameter of the positive electrode mixture layer" refers to the pore diameter that exhibits the maximum frequency in the pore diameter distribution of the microholes (voids) present in the positive electrode mixture layer. To measure the peak pore diameter of the positive electrode mixture layer, the pore diameter distribution between 0.01 µm and 10 µm in the positive electrode mixture layer is measured by mercury porosimetry using a mercury porosimeter (for example, an Autopore IV9500 from Shimadzu Corporation)

and the maximum frequency pore diameter therein can be determined to give the peak pore diameter.

<<The Electrode Assembly Fabrication Step>>

The electrode assembly fabrication step S40 is described in the following. In this embodiment, an electrode assembly is fabricated that has the positive electrode fabricated in the positive electrode fabrication step S30 and a negative electrode containing at least a negative electrode active material. The electrode assembly in the lithium ion secondary battery of this embodiment (for example, a stacked electrode assembly or a wound electrode assembly) is provided with a positive electrode; a negative electrode, and a separator interposed between the positive electrode and negative electrode. A wound-type electrode assembly (wound electrode assembly) provided with the previously described positive electrode formed into a sheet, a negative electrode, infra, formed into a sheet, and a separator sheet is described here by way of example, but this should not be taken to imply a limitation to this configuration.

The negative electrode in the lithium ion secondary battery (sealed nonaqueous electrolyte secondary battery) is provided with a negative electrode current collector and a negative electrode mixture layer that contains at least a negative electrode active material and that is formed on the negative electrode current collector. The method for fabricating this negative electrode is not particularly limited, and, for example, fabrication can be carried out by preparing a paste-form composition (referred to below as the "negative electrode composition") by mixing the negative electrode active material, a binder, and so forth, in a suitable solvent and applying this negative electrode composition on a negative electrode current collector to form a negative electrode mixture layer (also referred to as a negative electrode active material layer). The method of producing the negative electrode composition and so forth can be the same procedure as described above for the positive electrode. The solids fraction in the negative electrode composition is not particularly limited and can be brought to, for example, 40 mass % to 65 mass % (preferably 45 mass % to 55 mass % and more preferably 45 mass % to 50 mass %). The same procedures as described above for the positive electrode can also be used to form the negative electrode mixture layer and for the drying method.

The thickness and density of the negative electrode mixture layer can be adjusted by executing a suitable pressing treatment on the negative electrode. The density of the negative electrode mixture layer after the pressing treatment is not particularly limited, but, for example, can be brought to at least 1.1 g/cm$^3$ (typically at least 1.2 g/cm$^3$, for example, at least 1.3 g/cm$^3$), but not more than 2.0 g/cm$^3$ (typically not more than 1.8 g/cm$^3$).

A conductive member composed of a metal with a good electroconductivity (for example, copper, nickel, titanium, stainless steel, and so forth) is preferably used as the negative electrode current collector. The negative electrode current collector can assume the same shapes as indicated for the positive electrode current collector.

A single material or two or more materials selected from the substances used in conventional lithium ion secondary batteries (sealed nonaqueous electrolyte secondary batteries) can be used without particular limitation as the negative electrode active material. Examples are carbon materials such as natural graphite, artificial graphites produced from petroleum or coal and modifications of these artificial graphites, hard carbon (graphitization-resistant carbon), soft carbon (easily graphitizable carbon), carbon nanotubes, and so forth; metal oxide materials such as lithium titanium complex oxides, iron oxides, and so forth; and metal materials such as metals such as tin (Sn), silicon (Si), aluminum (Al), zinc (Zn), lithium (Li), and so forth, and metal alloys composed mainly of these metal elements. Among these, the use of graphite is preferred because it provides a high energy density. The proportion of the negative electrode active material in the negative electrode mixture layer as a whole is not particularly limited, but generally is suitably brought to about at least 50 mass % and is preferably from at least 90 mass % to not more than 99.5 mass % (for example, from at least 95 mass % to not more than 99 mass %).

The binder can be a suitable selection from the polymers provided above as examples of the binder for use in the positive electrode mixture layer. Specific examples are SBR, PVDF, and PTFE. The proportion of the binder in the negative electrode mixture layer as a whole is not particularly limited, and can be, for example, from at least 0.5 mass % to not more than 10 mass % (preferably from at least 2 mass % to not more than 5 mass %). In addition, the various additives (for example, CMC as a dispersant), conductive agents, and so forth, already described above can also be used as appropriate.

Existing separators can be used without particular limitation as the separator in the lithium ion secondary battery (sealed nonaqueous electrolyte secondary battery). For example, a porous resin sheet (microporous resin sheet) is preferably used. A porous polyolefin resin sheet of, for example, polyethylene (PE) or polypropylene (PP), is preferred. For example, a PE sheet, PP sheet, or a sheet having a three-layer structure (PP/PE/PP structure) in which a PP layer is laminated on both sides of a PE layer is preferably used.

The thickness of the separator is not particularly limited, but can be, for example, from at least 10 μm to not more than 50 μm (typically from at least 10 μm to not more than 40 μm). The properties of the separator (typically a porous resin sheet) are also not particularly limited, and, for example, a separator having a pore diameter of approximately 0.001 μm to 30 μm (typically 0.01 μm to 20 μm, for example, 0.1 μm to 10 μm) can be used. In addition, for example, a separator having a porosity (void ratio) approximately from at least 20 volume % to not more than 90 volume % (typically from at least 30 volume % to not more than 80 volume %, for example, from at least 35 volume % to not more than 70 volume %) can be used. In this Specification, the "pore diameter" refers to the value obtained based on measurement by an ordinary mercury porosimetric procedure. In addition, the "porosity" denotes the value calculated by dividing the pore volume (Vb (cm$^3$)) measured by mercury porosimetry by the apparent volume (Va (cm$^3$)) and multiplying by 100.

Figure 2:
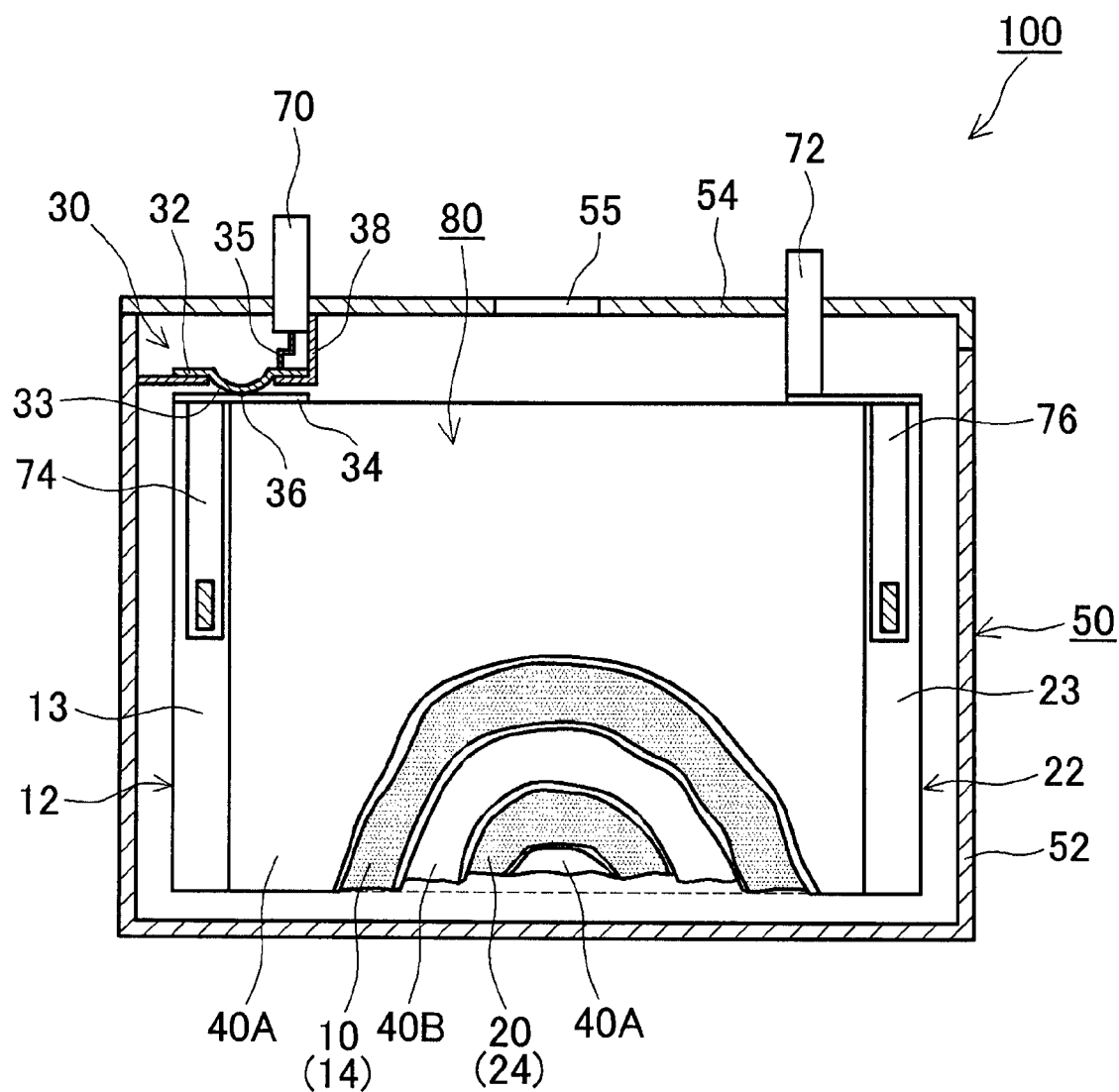
FIG. 2 is a cross-sectional diagram on the II-II line in FIG. 1.
Figure 3:
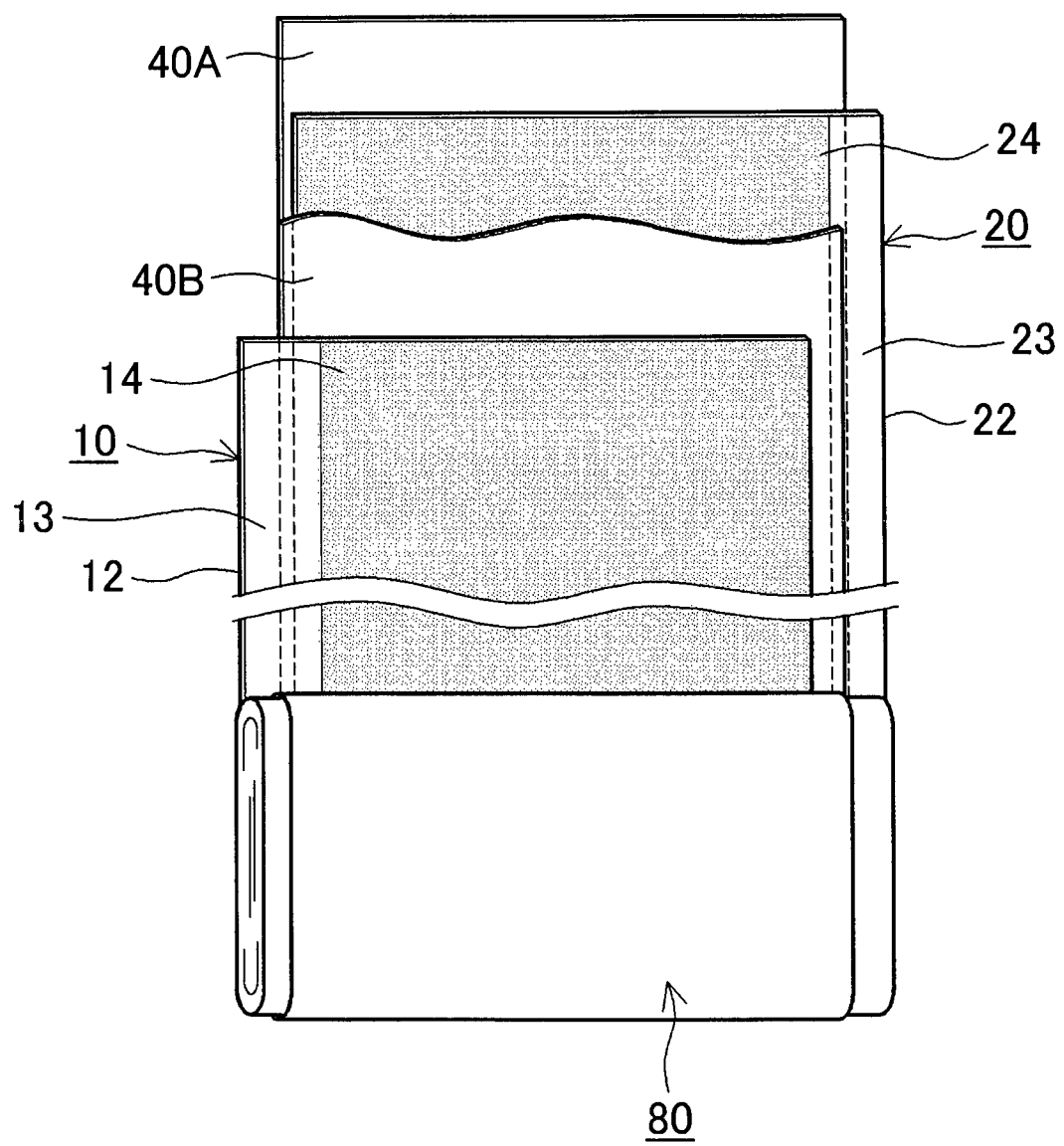
FIG. 3 is a schematic diagram that shows the structure of a wound electrode assembly for a sealed nonaqueous electrolyte secondary battery according to an embodiment of the invention.

FIG. 3 is a wound electrode assembly 80 according to this embodiment. The wound electrode assembly 80 is a flat wound electrode assembly 80 fabricated by winding a sheet-form positive electrode 10 and a sheet-form negative electrode 20 with a total of two long strip-shaped separator sheets 40A, 40B interposed therebetween in their length direction and then flattening the obtained winding by pressing from the side direction. When the stacking is carried out, it is done with the positive electrode 10 and the negative electrode 20 shifted somewhat in the width direction so a positive electrode mixture layer-free region (i.e., a region where the positive electrode current collector 12 lacking the positive electrode mixture layer 14 is exposed) 13 on the positive electrode 10 and a negative electrode mixture layer-free region (i.e., a region where the negative electrode current collector 22 lacking the negative electrode mixture layer 24 is exposed) 23 on the negative electrode 20 extend, respectively, from the two sides, considered in the width direction, of the separator sheets 40A, 40B. As a result, and as shown in FIG. 2, the electrode mixture layer-free regions 13, 23 on the positive electrode 10 and the negative electrode 20 then each extend to the outside, considered in the direction transverse to the winding direction of the wound electrode assembly 80, from the wound core region (i.e., the region where the positive electrode mixture layer 14 of the positive electrode 10, the negative electrode mixture layer 24 of the negative electrode 20, and the two separator sheets 40A, 40B are densely wound). As described below, a positive electrode current collector plate 74, which is electrically connected to a positive electrode terminal 70 (for example, of aluminum), is joined to this positive electrode mixture layer-free region 13, thereby electrically connecting the positive electrode terminal 70 to the positive electrode 10 of the flattened wound electrode assembly 80. Similarly, a negative electrode current collector plate 76, which is electrically connected to a negative electrode terminal 72 (for example, of nickel), is joined to the negative electrode mixture layer-free region 23, thereby electrically connecting the negative electrode terminal 72 to the negative electrode 20. The positive and negative electrode current collector plates 74, 76 can be joined, respectively, to the positive and negative electrode current collectors 12, 22 by, for example, ultrasonic welding, resistance welding, and so forth.

<<The Housing Step>>

The housing step S50 is described in the following. In this embodiment, the following are housed, in a battery case: the electrode assembly fabricated in the electrode assembly fabrication step S40 described above and a nonaqueous electrolyte containing a gas generator capable of a gas-generating decomposition when a prescribed battery voltage is exceeded.

Figure 1:
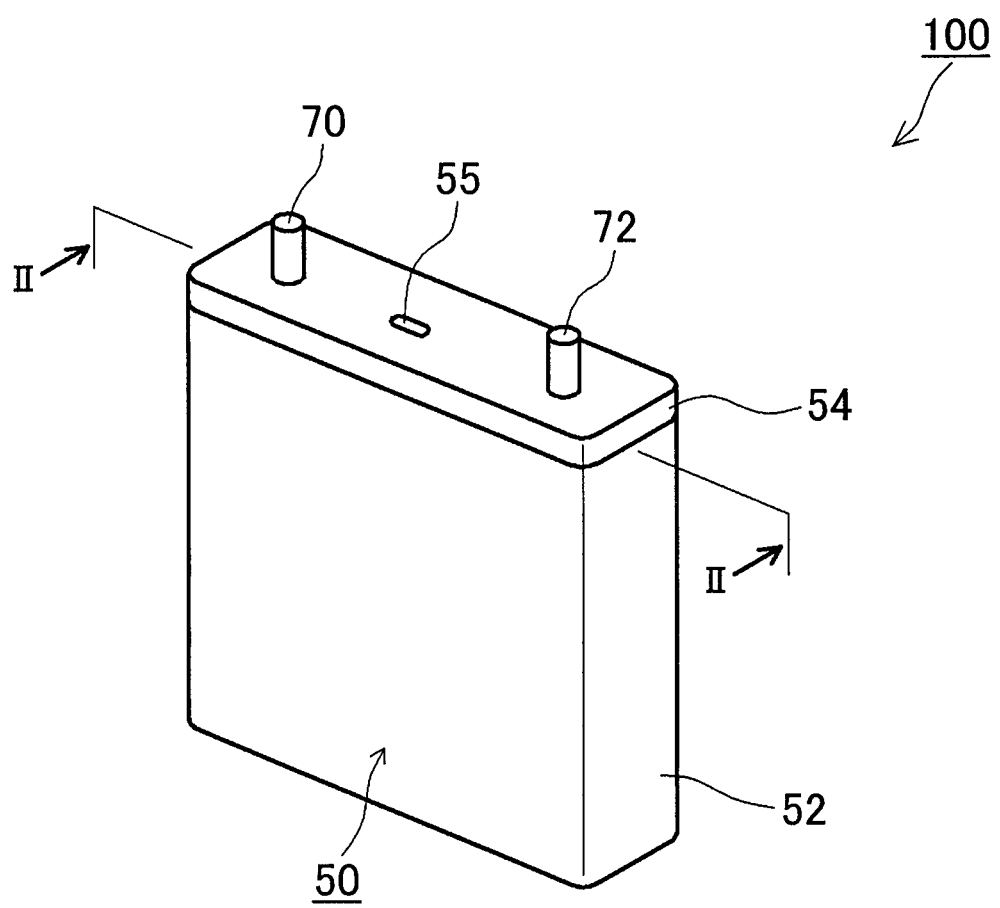
FIG. 1 is a perspective drawing that schematically shows the outer shape of a sealed nonaqueous electrolyte secondary battery according to an embodiment of the invention.

As shown in FIG. 1 and FIG. 2, the battery case (outer container) 50 in this embodiment is a metal battery case (for example, of aluminum; a resin or laminate film construction is also suitable) and is provided with a flat rectangular (rectangular parallelepiped) battery case main body 52 that has a bottom and is open at its upper end and with a lid 54 that closes this opening. The upper side of the battery case 50 (i.e., the lid 54) is provided with a positive electrode terminal 70 that electrically connects to the positive electrode sheet 10 of the wound electrode assembly 80 and with a negative electrode terminal 72 that electrically connects with the negative electrode sheet 20 of this electrode assembly 80. In addition, in the same fashion as for the battery case of a conventional lithium ion secondary battery (sealed nonaqueous electrolyte secondary battery), the lid 54 is provided with a safety valve 55 for discharging gas generated within the battery case to outside the case. This safety valve 55 is typically set to open at or above the pressure that operates a current interrupt device 30. Also formed in the lid 54 is an injection port (not shown) for injecting the nonaqueous electrolyte, infra, into the wound electrode assembly 80 housed in the battery case main body 52. The injection port is sealed with a plug after the nonaqueous electrolyte has been injected.

A current interrupt device 30 that operates when the pressure within the battery case 50 becomes equal to or than a predetermined pressure is disposed in the interior of the battery case 50. This current interrupt device 30 should be structured to break a conduction pathway (for example, the charging pathway) to the electrode assembly 80 from at least one of the electrode terminals when the internal pressure in the battery case 50 rises, but is not limited to a particular configuration. In the embodiment shown in FIG. 2, the current interrupt device 30 is placed between the positive electrode terminal 70 that is fixed in the lid 54 and the electrode assembly 80 and is constructed to break the conduction pathway to the electrode assembly 80 from the positive electrode terminal 70 when the internal pressure in the battery case 50 rises.

More specifically, this current interrupt device 30 can contain, for example, a first member 32 and a second member 34. In addition, it is structured such that, when the internal pressure in the battery case 50 rises, the first member 32 and/or the second member 34 undergoes deformation and the aforementioned conduction pathway is broken by a separation from the other member. In the embodiment shown in FIG. 2, the first member 32 is a metal deformation plate and the second member 34 is a metal connection plate that joins to the metal deformation plate 32. The metal deformation plate (first member) 32 has an arch shape in which the central region is curved downward, while at its edge region it is connected through a current collector lead terminal 35 to the bottom of the positive electrode terminal 70. In addition, the tip of a curved portion 33 of the metal deformation plate 32 is joined to the upper side of the metal connection plate 34. The positive electrode current collector plate 74 is joined to the lower surface (back side) of the metal connection plate 34, and this positive electrode current collector plate 74 is connected to the positive electrode 10 (positive electrode current collector 12) of the electrode assembly 80. A conduction pathway is formed in this manner from the positive electrode terminal 70 to the electrode assembly 80.

The current interrupt device 30 is also provided with an insulating case 38 formed of, for example, a plastic. This insulating case 38 is disposed so as to enclose the metal deformation plate 32 and to thereby provide a gastight enclosure of the upper surface of the metal deformation plate 32. The inner pressure of the battery case 50 does not act on this gastight-enclosed upper surface of the curved portion 33. The insulating case 38 also has an opening that is traversed by the curved portion 33 of the metal deformation plate 32, and the lower surface of the curved portion 33 is exposed from this opening to the interior of the battery case 50. The interior pressure in the battery case 50 acts on this lower surface of the curved portion 33 that is exposed to the interior of the battery case 50. In the thusly structured current interrupt device 30, when the internal pressure in the battery case 50 rises, this internal pressure acts on the lower surface of the curved portion 33 of the metal deformation plate 32 and the curved portion 33, which is curved downward, is pressed upward. This upward pressing on the curved portion 33 increases as the internal pressure in the battery case 50 rises. In addition, when the internal pressure in the battery case 50 exceeds a set pressure, the curved portion 33 is deflected perpendicularly backward and is deformed by bending upward. The connection point 36 between the metal deformation plate 32 and the metal connection plate 34 is broken by this deformation of the curved portion 33. The conduction pathway from the positive electrode terminal 70 to the electrode assembly 80 is broken as a result and the overcharging current is then shut off.

The current interrupt device 30 is not limited to the positive electrode terminal 70 side and may be disposed on the negative electrode terminal 72 side. In addition, the current interrupt device 30 is not limited to a mechanical interruption associated with the deformation of the metal deformation plate 32 as described above, and, for example, the internal pressure in the battery case 50 can be detected by a sensor and the current interrupt device can take the form of an external circuit that will interrupt the charging current when the internal pressure detected by this sensor exceeds a set pressure.

The nonaqueous electrolyte here can be a single nonaqueous electrolyte or two or more nonaqueous electrolytes selected without particular limitation from the same nonaqueous electrolytes as used in conventional lithium ion secondary batteries (sealed nonaqueous electrolyte secondary batteries). The electrolyte here typically has a composition that contains a supporting electrolyte (typically a lithium salt) in a suitable nonaqueous solvent.

An aprotic solvent such as, for example, a carbonate, ester, ether, nitrile, sulfone, or lactone, can be used as this nonaqueous solvent (organic solvent). Examples are ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol, dimethyl ether, ethylene glycol, diethyl ether, acetonitrile, propionitrile, nitromethane, N,N-dimethylformamide, dimethyl sulfoxide, sulfolane, and γ-butyrolactone. Only a single one of these nonaqueous solvents may be used by itself or two or more may be used in combination.

The conventional various materials capable of functioning as supporting electrolytes in lithium ion secondary batteries (sealed nonaqueous electrolyte secondary batteries) can be used as the supporting electrolyte. For example, a single selection or two or more, selections from various lithium salts, e.g., $LiPF_6$, $LiBF_4$, $LiClO_4$, $LiN(SO_2CF_3)_2$, $LiN(SO_2C_2F_5)_2$, $LiCF_3SO_3$, $LiC_4F_9SO_3$, $LiC(SO_2CF_3)_3$, and $LiClO_4$, can be used. Among these, the use of $LiPF_6$ is preferred. The concentration of the supporting electrolyte is not particularly limited; however, the amount of charge carrier (typically the lithium ion) present in the electrolyte will be deficient when this concentration is very low. Therefore, the ionic conductivity will tend to decline. When this concentration is very high, the electrolyte will have a high viscosity in the temperature range at and below room temperature (for example, 0° C. to 30° C.) and the ionic conductivity will tend to decline. As a consequence, the concentration of the supporting electrolyte is preferably from at least 0.1 mol/L to not more than 2 mol/L (preferably from at least 0.8 mol/L to not more than 1.5 mol/L).

The gas generator can be one or two or more selections, without particular limitation, from among compounds that are capable of undergoing a gas-generating decomposition when a prescribed battery voltage is exceeded (i.e., compounds that have an oxidation potential at least as high as the operating voltage of the lithium ion secondary battery (sealed nonaqueous electrolyte secondary battery) and that undergo a gas-generating decomposition when the battery enters an overcharged state) and that are used for this same service. Specific examples are aromatic compounds such as biphenyl compounds, alkylbiphenyl compounds, cycloalkylbenzene compounds, alkylbenzene compounds, organophosphorus compounds, fluorine-substituted aromatic compounds, carbonate compounds, cyclic carbamate compounds, and alicyclic hydrocarbons. These compounds can be more specifically exemplified (with the oxidation potential (vs. $Li/Li^+$) of the compound) by biphenyl (4.5 V), cyclohexylbenzene (4.6 V), 1-fluoro-2-cyclohexylbenzene (4.8 V), 1-fluoro-3-cyclohexylbenzene (4.8 V), 1-fluoro-4-cyclohexylbenzene (4.8 V), 1-bromo-4-cyclohexylbenzene (4.8 V), trans-butylcyclohexylbenzene (4.6 V), cyclopentylbenzene, tert-butylbenzene (4.9 V), tert-pentylbenzene (4.8 V), 1-fluoro-4-tert-butylbenzene (4.9 V), 1-chloro-4-tert-butylbenzene (4.9 V), 1-bromo-4-tert-butylbenzene (4.9 V), 1-fluoro-4-tert-pentylbenzene (4.8 V), 1-chloro-4-tert-pentylbenzene (4.8 V), 1-bromo-4-tert-pentylbenzene (4.8 V), tert-aminobenzene, terphenyl, 2-fluorobiphenyl, 3-fluorobiphenyl, 4-fluorobiphenyl, 4,4'-difluorobiphenyl, o-cyclohexylfluorobenzene, p-cyclohexylfluorobenzene, tris(t-butylphenyl)phosphate (4.8 V), phenyl fluoride (4.9 V), 4-fluorophenyl acetate (4.7 V), diphenyl carbonate (4.9 V), methyl phenyl carbonate (4.8 V), bis-tertiary-butylphenyl carbonate (4.7 V), diphenyl ether, and dibenzofuran. Among the preceding, the use is preferred of cyclohexylbenzene and biphenyl.

The amount of addition of the gas generator is not particularly limited; however, when this amount of addition is very low, little gas will be generated during overcharging and the current interrupt device may not operate properly. When added in a substantial excess in order to focus on reliability, the battery performance may be reduced. Accordingly, the amount of gas generator addition, expressed with reference to 100 mass % for the nonaqueous electrolyte, is preferably from at least 0.1 mass % (typically at least 0.5 mass %, for example, at least 1 mass %) to not more than 10 mass % (typically not more than 5 mass %, for example, not more than 4 mass %, preferably not more than 3 mass %, and more preferably not more than 2 mass %). Bringing the amount of gas generator addition into this range makes it possible to have a high reliability co-exist in balance with an excellent battery performance. When cyclohexylbenzene and biphenyl are used as the gas generator, the ratio A/B is preferably 1 to 4 (for example, A/B=3) where A is the amount of addition [mass %] of the cyclohexylbenzene with reference to the nonaqueous electrolyte and B is the amount of addition [mass %] of the biphenyl with reference to the nonaqueous electrolyte. When A/B is in this range, when the pressure in the battery case rises the current interrupt device can then operate very rapidly due to the excellent gas generation based on the decomposition of the cyclohexylbenzene and biphenyl.

As shown in FIG. 2, a lithium ion secondary battery (sealed nonaqueous electrolyte secondary battery) 100 can be fabricated by housing the wound electrode assembly 80 fabricated in the previously described electrode assembly fabrication step S40 in a battery case 50 along with a nonaqueous electrolyte that contains a gas generator capable of a gas-generating decomposition when a prescribed battery voltage is exceeded and by carrying out a prescribed charge/discharge treatment.

The lithium ion secondary battery 100 according to this embodiment is provided, as shown in FIG. 2, with a wound electrode assembly 80 having a positive electrode sheet 10 and a negative electrode sheet 20, a nonaqueous electrolyte, and a battery case 50 that houses the wound electrode assembly 80 and the nonaqueous electrolyte. The nonaqueous electrolyte in this embodiment contains a gas generator that can undergo a gas-generating decomposition when a prescribed battery voltage is exceeded, and the battery case 50 is provided with a current interrupt device 30 that operates when the pressure in the battery case 50 rises accompanying the gas generation. As shown in FIG. 4, the positive electrode sheet 10 is provided with a positive electrode current collector 12 and a positive electrode mixture layer 14 formed on the positive electrode current collector 12. The positive electrode mixture layer 14 contains at least a positive electrode active material 16 having a complex oxide containing at least nickel, cobalt, and manganese as transition metal elements and, as conductive agents, electroconductive carbon particles 18 and expanded graphite 17 having an average pore diameter of 0.2 µm to 0.5 µm. Thus, while the lithium ion secondary battery 100 according to this embodiment uses a positive electrode active material 16 that has a relatively low electroconductivity, due to the incorporation of the electroconductive carbon particles 18 and the expanded graphite 17 with an average pore diameter of 0.2 µm to 0.5 µm as conductive agents, a reduction in the resistance of the positive electrode sheet can be realized and at the same time numerous pores having relatively large pore diameters (for example, 0.5 µm to 1 µm) can be formed in the positive electrode mixture layer 14 of the positive electrode sheet 10. As a consequence, the lithium ion secondary battery according to this embodiment realizes a reduction in the battery resistance and at the same time provides a high reliability in terms of ensuring the generation of an adequate amount of gas during a pressure rise within the battery case 50.

Figure 6:
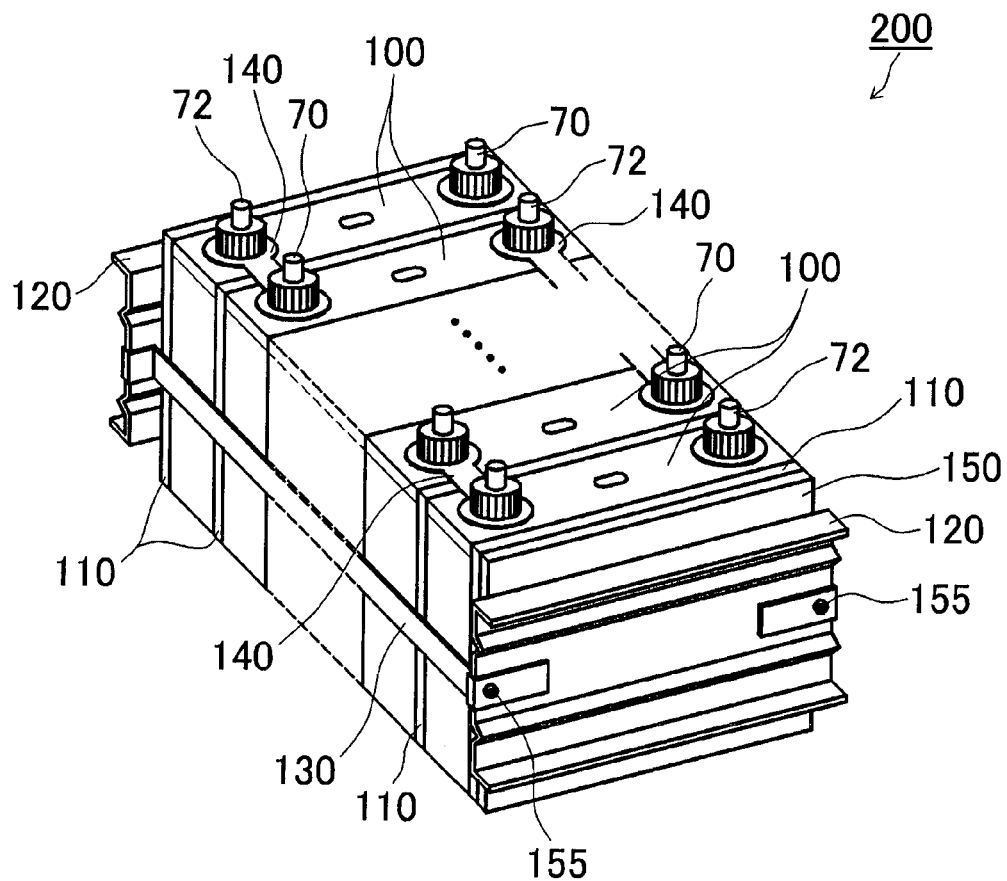
FIG. 6 is a perspective drawing that schematically shows a battery pack in which a plurality of sealed nonaqueous electrolyte secondary batteries according to an embodiment of the invention are combined.

FIG. 6 shows an example of a battery pack 200 in which lithium ion secondary batteries (single cells) 100 are connected in series and/or parallel. The lithium ion secondary battery (single cell) 100 is a lithium ion secondary battery that realizes a reduced battery resistance and a high reliability in terms of ensuring the generation of an adequate amount of gas during a pressure rise within the battery case. As a consequence, for a battery pack in which a plurality of these single cells are interconnected (typically in series), the battery performance is excellent (low battery resistance) and the current interrupt device in each battery case can undergo very rapid operation upon a pressure rise therein in the event of a variation in the SOC among the individual single cells. In the battery pack 200 in the configuration shown in FIG. 6, a plurality (typically at least 10 and preferably approximately 40 to 80) of the sealed nonaqueous electrolyte secondary batteries (single cells) 1.00 are arrayed in a direction in which the wide sides of the battery cases 50 face each other (stacking direction), while being reversed from one to another such that their respective positive electrode terminals 70 and negative electrode terminals 72 alternate. Cooling plates 110 with a prescribed shape are sandwiched between the thusly arrayed single cells 100. These cooling plates 110 function as heat-radiating members in order to efficiently diffuse the heat generated within the individual single cells 100 during use and preferably have a shape that enables the introduction of a cooling fluid (typically air) between the single cells 100 (for example, a shape in which a plurality of parallel grooves are disposed in the surface of a rectangular cooling plate and run perpendicularly from one edge thereof to the opposite edge). The cooling plate is advantageously made of a metal having an excellent thermal conductivity or a light, hard synthetic resin such as polypropylene and so forth.

A pair of end plates (retaining plates) 120 are disposed at the two ends of the thusly arrayed single cells 100 and cooling plates 110. In addition, one or a plurality of sheet-shaped spacer members 150 may be sandwiched as length adjustment means between the cooling plates 110 and the end plates 120. The thusly arrayed single cells 100, cooling plates 110, and spacer members 150 are retained by the application of a prescribed retaining pressure in the stacking direction by a tightening retaining band 130 that is installed to run between the two end plates. More particularly, the single cells and so forth are retained by the application of a prescribed retaining pressure in their array direction by fastening and fixing the end of the retaining band 130 to the end plate 120 using a screw 155. This also functions to apply the retaining pressure to the wound electrode assembly 80 housed within the battery case 50 of each single cell 100. In addition, the positive electrode terminal 70 of one single cell 100 is electrically connected by a connection member (a bus bar) 140 to the negative electrode terminal 72 of another adjacent single cell 100. A battery pack 200 having a desired voltage is constructed by this serial interconnection of the individual single cells 100.

Examples of the invention are described in the following, but this should not be construed to imply that the invention is limited to what is shown in these examples.

Lithium Ion Secondary Battery (Sealed Nonaqueous Electrolyte Secondary Battery) Fabrication Example 1

$LiNi_{1/3}CO_{1/3}Mn_{1/3}O_2$ as the positive electrode active material, AB with an average particle diameter (average secondary particle diameter) of 0.2 µm as a conductive agent, an expanded graphite A having an average pore diameter of 0.21 µm as a conductive agent, and PVDF as the binder were weighed out to provide a mass ratio thereamong of 91:3:3:3, and these materials were then dispersed in NMP to prepare a paste-form positive electrode composition according to Example 1. This composition was coated on the surface of a 15 µm-thick positive electrode current collector (aluminum foil). This was followed by drying the composition for 6 hours in a vacuum at 120° C. and a rolling treatment using a roll press machine to produce a positive electrode sheet having a positive electrode mixture layer with a mixture density of 2.8 g/cm³ formed on the positive electrode current collector. The composition was applied at a rate of 30 mg/cm². The length of the positive electrode sheet in its long direction was 300 cm and it had a width of 9.5 cm. The expanded graphite A was a graphite (expanded graphite) provided by expanding "KS-15" (trade name) graphite from TIMCAL Limited by subjecting it to a sulfuric acid treatment and then a heat treatment at 800° C.

The pore diameter distribution between 0.01 µm and 10 µm in the positive electrode mixture layer according to Example 1 was measured by mercury porosimetry using a mercury porosimeter (Autopore IV9500 from Shimadzu Corporation), and the highest frequency pore diameter therein was determined to give the peak pore diameter of the positive electrode mixture layer. The peak pore diameter of the positive electrode mixture layer according to Example 1 was 0.55 µm.

Then, graphite as the negative electrode active material, SBR as a binder, and CMC as a thickener were weighed out to provide a mass ratio thereamong of 98:1:1, and these materials were then dispersed in water to prepare a paste-form composition for forming a negative electrode mixture layer. This composition was coated on the surface of a 10 µm-thick negative electrode current collector (copper foil). This was followed by drying the composition for 6 hours in a vacuum at 120° C. and a rolling treatment using a roll press machine to produce a negative electrode sheet having a negative electrode mixture layer with a mixture density of 1.4 g/cm³ formed on the negative electrode current collector. The coating quantity for this composition was adjusted to provide a ratio between the theoretical capacity of the positive electrode and the theoretical capacity of the negative electrode of 1 (positive electrode):1.4 (negative electrode). The length of the negative electrode sheet in its long direction was 320 cm, and its width was 10.5 cm.

A wound electrode assembly was fabricated by winding the thusly fabricated positive electrode sheet and negative electrode sheet with two prepared separator sheets (20 μm-thick microporous polyethylene resin sheets) interposed therebetween. This electrode assembly was housed in a rectangular battery case; a pressure-actuated current interrupt device was disposed in proximity to the opening in the battery case; and closure was effected by welding. A nonaqueous electrolyte was injected through an injection port in the battery case; an aluminum plate was then placed over the injection port; and joining was performed by laser welding to fabricate a lithium ion secondary battery according to Example 1. The nonaqueous electrolyte was a nonaqueous electrolyte prepared by dissolving $LiPF_6$ as the supporting electrolyte at a concentration of 1.0 mol/L in a mixed solvent containing EC and DEC at an EC:DEC=3:7 volumetric ratio and additionally incorporating therein cyclohexylbenzene (CHB) as a gas generator in a proportion of 0.3 mass % and biphenyl (BP) as a gas generator in a proportion of 1 mass %.

Example 2

The lithium ion secondary battery according to Example 2 was fabricated proceeding as in Example 1, with the exception that, after the positive electrode composition according to Example 1 had been coated on the surface of the positive electrode current collector, a magnetic field was applied to the coated positive electrode composition; in the direction orthogonal to the surface of the positive electrode current collector. The strength of the magnetic field was 0.7 T and the magnetic field was applied for 3 seconds. The positive electrode mixture layer according to Example 2 had a peak pore diameter of 0.58 μm.

Example 3

$LiNi_{1/3}Co_{1/3}Mn_{1/3}O_2$, AB with an average particle diameter (average secondary particle diameter) of 0.2 μm, expanded graphite A having an average pore diameter of 0.21 μm, and PVDF were weighed out to provide a mass ratio thereamong of 91:2:3:3, and these materials were then dispersed in NMP to prepare a paste-form positive electrode composition according to Example 3. The lithium ion secondary battery according to Example 3 was fabricated proceeding as in Example 1, but using the composition according to Example 3. The positive electrode mixture layer according to Example 3 had a peak pore diameter of 0.71 μm.

Example 4

The lithium ion secondary battery according to Example 4 was fabricated proceeding as in Example 2, but coating the surface of the positive electrode current collector with the positive electrode composition according to Example 3. The positive electrode mixture layer according to Example 4 had a peak pore diameter of 0.7 μm.

Example 5

$LiNi_{1/3}Co_{1/3}Mn_{1/3}O_2$, AB with an average particle diameter (average secondary particle diameter) of 0.2 μm, an expanded graphite B having an average pore diameter of 0.35 μm, and PVDF were weighed out to provide a mass ratio thereamong of 91:2:3:3, and these materials were then dispersed in NMP to prepare a paste-form positive electrode composition according to Example 5. The lithium ion secondary battery according to Example 5 was fabricated proceeding as in Example 1, but using the composition according to Example 5. The expanded graphite B was a graphite (expanded graphite) provided by expanding "KS-15" (trade name) graphite from TIMCAL Limited by subjecting it to a sulfuric acid treatment and then a heat treatment at 1200° C. The positive electrode mixture layer according to Example 5 had a peak pore diameter of 0.92 μm.

Example 6

The lithium ion secondary battery according to Example 6 was fabricated proceeding as in Example 2, but coating the surface of the positive electrode current collector with the positive electrode composition according to Example 5. The positive electrode mixture layer according to Example 6 had a peak pore diameter of 0.96 μm.

Example 7

$LiNi_{1/3}Co_{1/3}Mn_{1/3}O_2$, AB with an average particle diameter (average secondary particle diameter) of 0.2 μm, an expanded graphite C having an average pore diameter of 0.52 μm, and PVDF were weighed out to provide a mass ratio thereamong of 91:3:3:3, and these materials were then dispersed in NMP to prepare a paste-form positive electrode composition according to Example 7. The lithium ion secondary battery according to Example 7 was fabricated proceeding as in Example 1, but using the composition according to Example 7. The expanded graphite C was a graphite (expanded graphite) provided by expanding "KS-15" (trade name) graphite from TIMCAL Limited by subjecting it to a sulfuric acid treatment and then a heat treatment at 2000° C. The positive electrode mixture layer according to Example 7 had a peak pore diameter of 0.64 μm.

Example 8

$LiNi_{1/3}CO_{1/3}Mn_{1/3}O_2$, AB with an average particle diameter (average secondary particle diameter) of 0.2 μm, a graphite D having an average particle diameter of 8 μm (trade name: "KS-15", from TIMCAL Limited) as a conductive agent, and PVDF were weighed out to provide a mass ratio thereamong of 91:3:3:3, and these materials were then dispersed in NMP to prepare a paste-form positive electrode composition according to Example 8. The lithium ion secondary battery according to Example 8 was fabricated proceeding as in Example 1, but using the composition according to Example 8. The positive electrode mixture layer according to Example 8 had a peak pore diameter of 0.52 μm.

Example 9

$LiNi_{1/3}Co_{1/3}Mn_{1/3}O_2$, AB with an average particle diameter (average secondary particle diameter) of 0.2 μm, a graphite E having an average particle diameter of 4 μm (trade name: "KS-6", from TIMCAL Limited) as a conductive agent, and PVDF were weighed out to provide a mass ratio thereamong of 91:3:3:3, and these materials were then dispersed in NMP to prepare a paste-form positive electrode composition according to Example 9. The lithium ion secondary battery according to Example 9 was fabricated proceeding as in Example 1, but using the composition according to Example 9. The positive electrode mixture layer according to Example 9 had a peak pore diameter of 0.24 μm.

Example 10

$LiNi_{1/3}Co_{1/3}Mn_{1/3}O_2$, AB with an average particle diameter (average secondary particle diameter) of 0.2 μm, a graphite E having an average particle diameter of 4 μm (trade name: "KS-6", from TIMCAL Limited) as a conductive agent, and PVDF were weighed out to provide a mass ratio thereamong of 91:2:3:3, and these materials were then dispersed in NMP to prepare a paste-form positive electrode composition according to Example 10. The lithium ion secondary battery according to Example 10 was fabricated proceeding as in Example 1, but using the composition according to Example 10. The positive electrode mixture layer according to Example 10 had a peak pore diameter of 0.24 μm. The characteristics of the lithium ion secondary batteries fabricated as described above are shown in Table 1.

TABLE 1

| example | amount of AB addition [mass %] | type of graphite | average pore diameter in the graphite [μm] | application of magnet field? | peak pore diameter in the positive electrode mixture layer [μm] |
|---|---|---|---|---|---|
| Example 1 | 3 | expanded graphite A | 0.21 | no | 0.55 |
| Example 2 | 3 | expanded graphite A | 0.21 | yes | 0.58 |
| Example 3 | 2 | expanded graphite A | 0.21 | no | 0.71 |
| Example 4 | 2 | expanded graphite A | 0.21 | yes | 0.7 |
| Example 5 | 2 | expanded graphite B | 0.35 | no | 0.92 |
| Example 6 | 2 | expanded graphite B | 0.35 | yes | 0.96 |
| Example 7 | 3 | expanded graphite C | 0.52 | no | 0.64 |
| Example 8 | 3 | graphite D | — | no | 0.52 |
| Example 9 | 3 | graphite E | — | no | 0.24 |
| Example 10 | 2 | graphite E | — | no | 0.38 |

[Measurement of the Battery IV Resistance]

Figure 8:
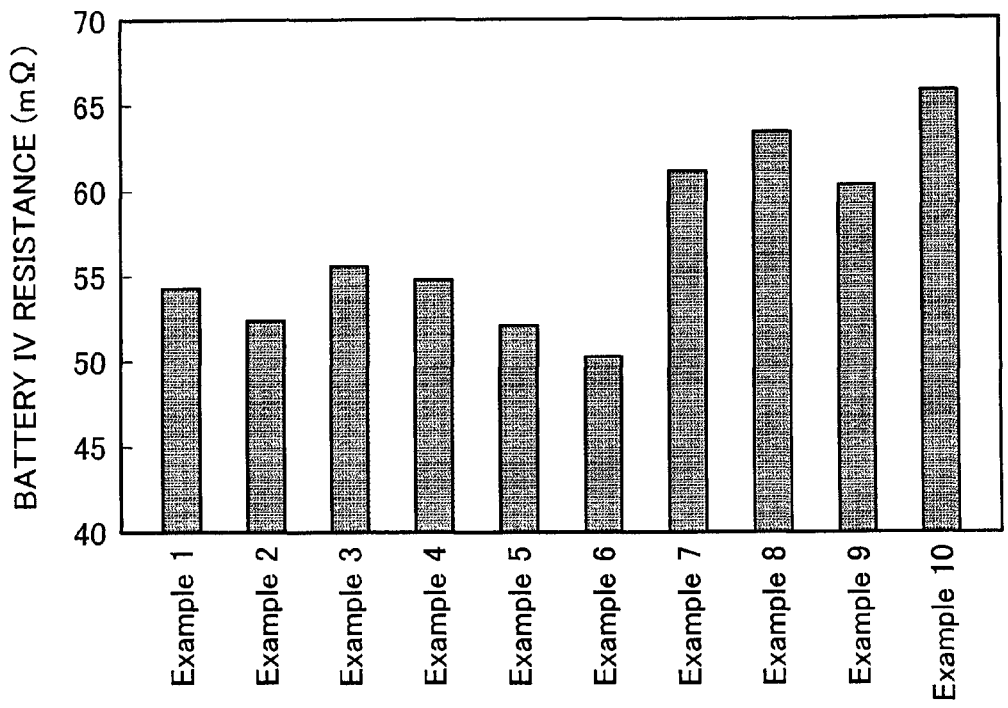
FIG. 8 is a graph that compares the IV resistance of each battery from Examples 1 to 10.

The battery IV resistance was measured on the lithium ion secondary batteries according to Examples 1 to 10 fabricated as described in the preceding. Thus, each battery was adjusted to a 20% SOC by carrying out CC discharge (constant-current discharge) at a discharge rate of 1 C (1 A) and by CC-CV charging (constant-current/constant-voltage charging) at a charging rate of 1 C. Then, discharge was carried out for 10 seconds at a 10 C discharge rate (amount of current X) at a temperature of 25° C., and the battery IV resistance [mΩ] was calculated from the voltage drop ΔV at 10 seconds after the start of the discharge (that is, battery IV resistance=voltage drop ΔV/amount of current X). The results of these measurements are given in Table 2 and FIG. 8. Here, "1 C" denotes the amount of current at which the battery capacity (Ah) predicted from the theoretical capacity of the positive electrode can be discharged in 1 hour.

[Overcharge Testing (Measurement of the Amount of Gas Generation)]

Figure 9:
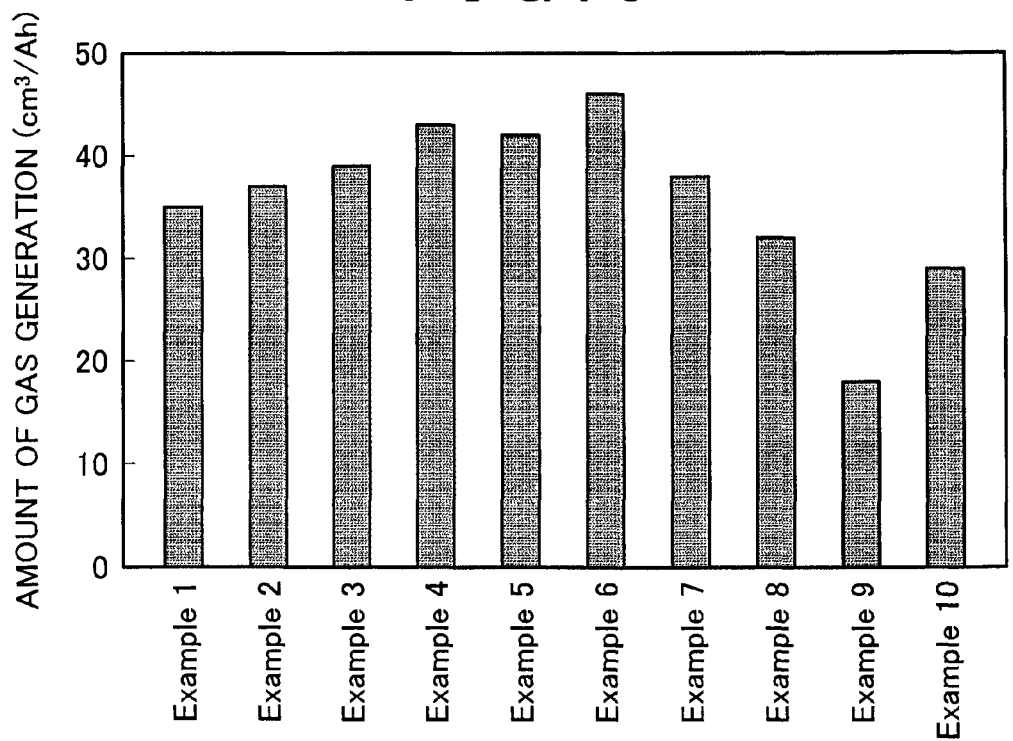
FIG. 9 is a graph that compares the amount of gas generation for each of Examples 1 to 10.
Figure 10:
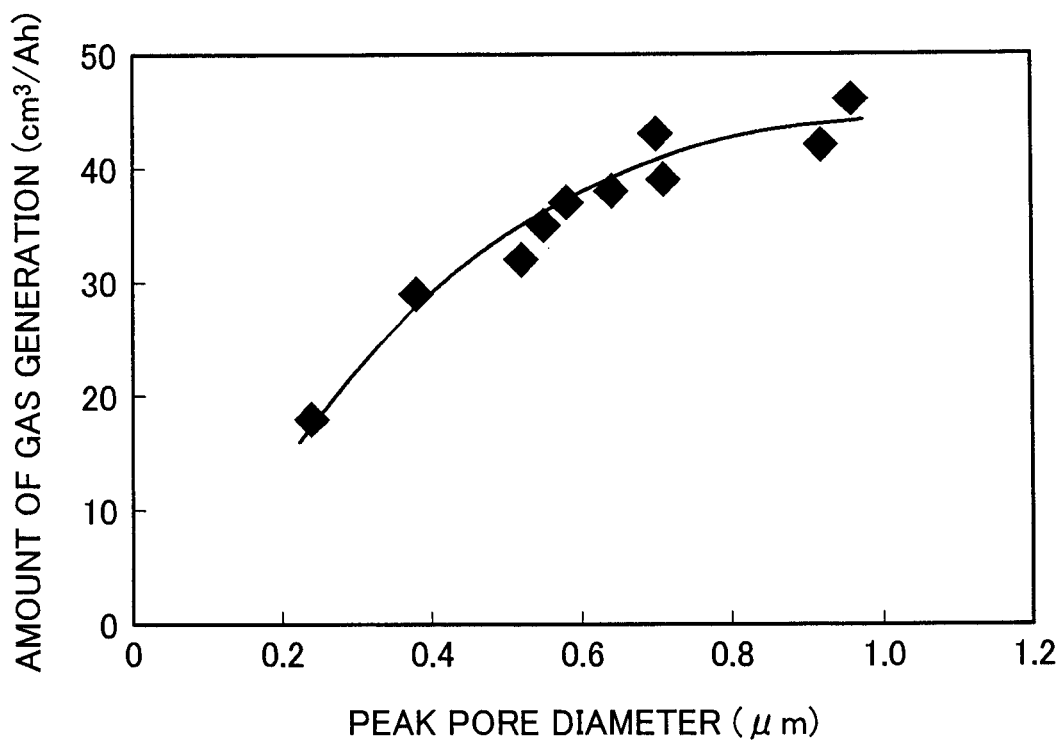
FIG. 10 is a graph that shows the relationship between the peak pore diameter in the positive electrode mixture layer and the amount of gas generation.

An appropriate conditioning treatment was performed at a temperature of 25° C. on the lithium ion secondary batteries fabricated according to Examples 1 to 10 (in this case, an initial charge/discharge treatment was run by performing the following twice: a process of constant-current charging to 4.1 V at a 0.3 C charging rate, a process of constant-current discharging to 3.0 V at a 0.3 C discharge rate). Each of the thusly conditioned lithium ion secondary batteries was then adjusted to a fully charged state of 100% SOC by CC-CV charging at a 1 C charging rate. The battery volume was measured by an Archimedean procedure for each of these fully charged lithium ion secondary batteries. After this, each of these lithium ion secondary batteries was constant-current charged at 60° C. from the fully charged state to an overcharged state (state with an SOC of 145% in this example) at a 0.5 C rate and the battery volume was re-measured by the Archimedean procedure. The volume (B ($cm^3$)) of the battery when fully charged was subtracted from the volume (A $cm^3$)) of the battery after overcharging to calculate the amount of gas generation (A−B ($cm^3$)) when overcharged. The results (A−B ($cm^3$/Ah)) provided by dividing this value by the battery capacity (Ah) are shown in Table 2 and FIG. 9. An Archimedean procedure is a procedure in which the volume of a measurement target is determined by immersing the measurement target (a rectangular battery in this example) in a fluid (for example, distilled water or an alcohol) and measuring the buoyant force acting on the measurement target. FIG. 10 shows the relationship between the amount of gas generation [$cm^3$/Ah] at 60° C. and the peak pore diameter [μm] of the positive electrode mixture layer.

TABLE 2

| example | application of magnetic field? | battery IV resistance [mΩ] | amount of gas generation at 60° C. [$cm^3$/Ah] |
|---|---|---|---|
| Example 1 | no | 54.3 | 35 |
| Example 2 | yes | 52.4 | 37 |
| Example 3 | no | 55.6 | 39 |
| Example 4 | yes | 54.8 | 43 |
| Example 5 | no | 52.1 | 42 |
| Example 6 | yes | 50.3 | 46 |
| Example 7 | no | 61.1 | 38 |
| Example 8 | no | 63.4 | 32 |
| Example 9 | no | 60.3 | 18 |
| Example 10 | no | 65.8 | 29 |

As shown in FIG. 10, the amount of gas generation at 60° C. was observed to exhibit a stable increase in the region where the peak pore diameter of the positive electrode mixture layer exceeded 0.5 μm. However, as shown in Table 1, Table 2, and FIG. 8, the battery IV resistance was observed to undergo a large increase in the lithium ion secondary battery according to Example 7, which had a peak pore diameter for the positive electrode mixture layer in excess of 0.5 μm but also an average pore diameter for the expanded graphite in the positive electrode mixture layer in excess of 0.5 μm, and for the lithium ion secondary batteries according to Examples 8 to 10, which contained an ordinary graphite in the positive electrode mixture layer. Based on this, it was determined that there is an optimal average pore diameter (0.2 μm to 0.5 μm) for the expanded graphite in the positive electrode mixture layer in order to reduce the battery IV resistance and ensure a satisfactory amount of gas generation. It was further determined that a reduction in the amount of AB contained in the positive electrode mixture layer, while resulting in some increase (an approximately 4% increase) in the battery IV resistance, also resulted in a large increase (an increase of about at least 10%) in the amount of gas generation at 60° C. due to an increase in the peak pore diameter in the positive electrode mixture layer (refer to Examples 1 and 3 and Examples 2 and 4). In addition, as shown in Table 2, FIG. 8, and FIG. 9, the lithium ion secondary batteries according to Examples 2, 4, and 6, in which a magnetic field was applied after the positive electrode composition had been coated on the surface of the positive electrode current collector, were confirmed to have a lower battery IV resistance and also an increased amount of gas generation at 60° C. in comparison to, respectively, the lithium ion secondary batteries according to Examples 1, 3, and 5, in which the magnetic field was not applied.

While specific examples of the invention have been described in detail in the preceding, these should be considered as nothing more than illustrative in nature.

Figure 7:
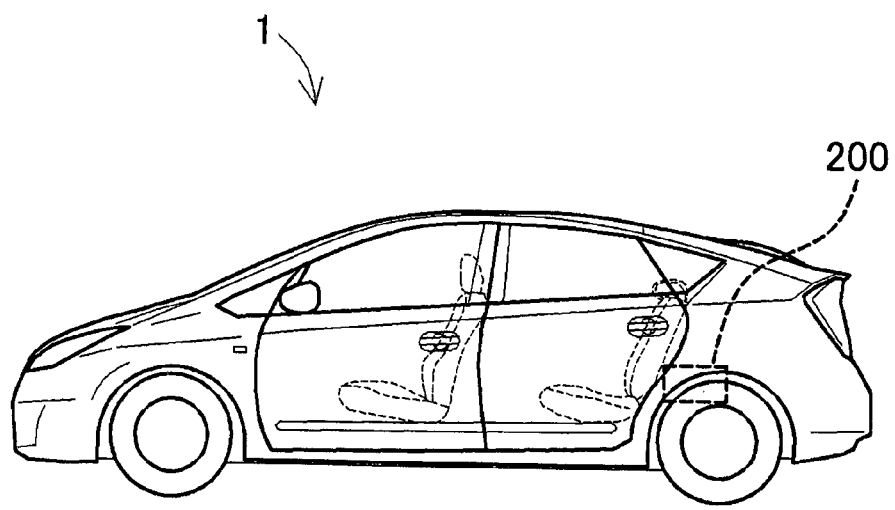
FIG. 7 is a drawing in side view that shows a vehicle (an automobile) that has been provided with a sealed nonaqueous electrolyte secondary battery according to an embodiment of the invention.

The sealed nonaqueous electrolyte secondary battery according to the embodiment of the invention—because it realizes a reduced battery resistance and a high reliability in terms of ensuring the generation of an adequate amount of gas during a pressure rise within the battery case—can be favorably used in particular as a drive power source mounted in a vehicle, for example, an automobile. Accordingly, and as shown schematically in FIG. 7, the embodiment of the invention provides a vehicle (typically an automobile and particularly an automobile provided with an electric motor, such as a hybrid automobile, an electric automobile, or a fuel cell automobile) 1 equipped with this sealed nonaqueous electrolyte secondary battery 100 (typically a battery pack 200 in which a plurality of these batteries 100 are connected in series) as a power source.

The invention claimed is:

1. A sealed nonaqueous electrolyte secondary battery comprising:
    an electrode assembly having a positive electrode and a negative electrode;
    a nonaqueous electrolyte containing a gas generator that is decomposed to generate a gas when a prescribed battery voltage is exceeded; and
    a battery case that houses the electrode assembly and the nonaqueous electrolyte and that comprises a current interrupt device that operates when a pressure within the battery case rises accompanying the gas generation;
    wherein the positive electrode is provided with a positive electrode current collector and a positive electrode mixture layer containing at least a positive electrode active material and formed on the positive electrode current collector, and
    the positive electrode mixture layer contains, as conductive agents, electroconductive carbon particles and an expanded graphite having an average pore diameter of 0.2 μm to 0.5 μm.

2. The secondary battery according to claim 1, wherein the positive electrode active material includes a complex oxide that contains at least nickel, cobalt, and manganese as transition metal elements.

3. The secondary battery according to claim 2, wherein a molar ratio between the nickel and manganese in the complex oxide is equal to or smaller than 1.5.

4. The secondary battery according to claim 1, wherein at least 50 mass % of the expanded graphite in the positive electrode mixture layer is disposed in a state in which an angle formed between (002) plane of the expanded graphite and a surface of the positive electrode current collector is at least 60°.

5. The secondary battery according to claim 1, wherein an amount of addition of the expanded graphite in the positive electrode mixture layer is larger than an amount of addition of the carbon particles in the positive electrode mixture layer.

6. The secondary battery according to claim 1, wherein the carbon particles are an acetylene black having an average particle diameter of 0.1 μm to 5 μm.

7. The secondary battery according to claim 1, wherein the gas generator includes cyclohexylbenzene and biphenyl, and a mass ratio between the cyclohexylbenzene and the biphenyl is 1 to 4.

8. A battery pack as a vehicle drive power source formed by electrically interconnecting a plurality of single cells, comprising:
    the sealed nonaqueous electrolyte secondary battery according to claim 1 as the single cell.

* * * * *